GAS REACTION AIRCRAFT POWER PLANT

Filed March 6, 1942 8 Sheets-Sheet 1

INVENTOR
NATHAN C. PRICE
BY George C. Sullivan

Feb. 6, 1951 N. C. PRICE 2,540,991

GAS REACTION AIRCRAFT POWER PLANT

Filed March 6, 1942 8 Sheets-Sheet 2

INVENTOR
NATHAN C. PRICE

BY George C. Sullivan

GAS REACTION AIRCRAFT POWER PLANT

Filed March 6, 1942 8 Sheets-Sheet 3

INVENTOR
NATHAN C. PRICE
BY George C. Sullivan

INVENTOR
NATHAN C. PRICE
BY George C. Sullivan

Feb. 6, 1951 N. C. PRICE 2,540,991

GAS REACTION AIRCRAFT POWER PLANT

Filed March 6, 1942 8 Sheets-Sheet 5

INVENTOR
NATHAN C. PRICE
BY George C. Sullivan

Feb. 6, 1951  N. C. PRICE  2,540,991

GAS REACTION AIRCRAFT POWER PLANT

Filed March 6, 1942  8 Sheets-Sheet 6

INVENTOR
NATHAN C. PRICE
BY George C. Sullivan

INVENTOR
NATHAN C. PRICE
BY George C. Sullivan

Feb. 6, 1951 N. C. PRICE 2,540,991

GAS REACTION AIRCRAFT POWER PLANT

Filed March 6, 1942 8 Sheets-Sheet 8

INVENTOR
NATHAN C. PRICE
BY George C. Sullivan

Patented Feb. 6, 1951 2,540,991

UNITED STATES PATENT OFFICE 2,540,991

GAS REACTION AIRCRAFT POWER PLANT

Nathan C. Price, Hollywood, Calif., assignor to Lockheed Aircraft Corporation, Burbank, Calif.

Application March 6, 1942, Serial No. 433,599

11 Claims. (Cl. 244—15)

This invention relates to prime movers of the gas reaction type in general and more particularly to the internal combustion, reaction types of engines, which function in the manner commonly known as "jet propulsion." This invention finds its principal application as a power plant or prime-mover for aircraft and the like high velocity vehicles and particularly high altitude airplanes designed for substratosphere or stratosphere flight.

In aircraft employing the conventional propeller for propulsion, present trends in development indicate that the practical limit of speeds attainable therewith lie in the region of five hundred miles per hour. This limitation occurs by reason of the inherent limitations in efficiencies of propellers as high speed propulsive units and is determined by their indicated abrupt falling-off of efficiencies to a low value which become prohibitive in power requirements at velocities in the region of five hundred miles per hour. The efficiencies of propellers of conventional design or of practical size when operated under rarified atmospheric conditions are such as also substantially to preclude their use in high speed stratosphere flight. Furthermore, the frontal area of airplanes for extremely high speed operation must necessarily be reduced below that now possible with the conventional types of power plants and the lifting efficiency of wings should be increased, both of which are accomplished by the novel features incorporated in the design of the power plant as will be described hereinafter.

Certain features of this invention also solve the peculiar installational problems associated with the type of power plant of this invention in the airplane, which require treatment entirely different from that for conventional power plants. The method of co-ordinating the power plant design and characteristics with the airplane per se and with accessory systems of the airplane requires special and novel measures which are included herein within the scope of the present invention.

It is accordingly an object of this invention to provide a propulsive unit for aircraft which does not possess the aforesaid speed limitations of the conventional power plant and propeller. It is a further object of this invention to provide a propulsion unit which will operate at augmented efficiency at speeds and at altitudes in excess of those practical with the conventional propeller apparatus. It is a further object of this invention to provide a propulsive unit adapted to operate efficiently at supersonic speeds and at altitudes within the stratosphere. It is also an object of this invention to provide a propulsive unit and associated apparatus which will be capable of imparting increased economy and flight range to the aircraft with which it is associated.

It is a further object of this invention to provide an improved aircraft propulsive unit which shall be economical in fuel consumption, light in weight and have a reduced frontal area in proportion to power developed.

It is a still further objective to provide a power plant incorporating suitable measures to insure improved operation of accessory systems of the airplane, and to offer the most areodynamically attractive type of power plant installation as a whole.

It is an objective to provide a power plant which is applicable to every type of airplane as a basic unit, which with replacement or addition of a few minor parts, can be made to operate supersonic, near sonic, or low speed freight airplanes.

It is an object to provide a power plant which is an improvement from maintenance and service standpoints, compared to conventional power plants.

The objects of this invention are attained in general by providing a power plant which produces propulsive work and force wholly or in part by means of the reaction of a high velocity expansible fluid jet.

This invention resides briefly in means to efficiently compress air in several stages by the combined effect of impact or "ramming" produced by the high velocity of the unit relative to the air and by the action of multiple stage power driven compressor units of high efficiency, introduction and constant combustion of fuel in the thus compressed air to form high temperature high volume gaseous products of combustion, and utilizing the expansion and reaction of the gases to drive the compressors and to supply reactive propulsive force to the unit, all subject to automatic controls acting in co-ordination with certain other mechanical portions of the airplane such as power driven landing wheels, boundary layer removal fans and/or take-off propellers.

Other objects and features of novelty will be evident hereinafter.

This invention in its preferred forms is illustrated in the drawings and hereinafter more fully described.

Referring to the drawings in which like reference numerals refer to corresponding parts throughout the several figures, the apparatus of the invention is as follows.

Figure 8:
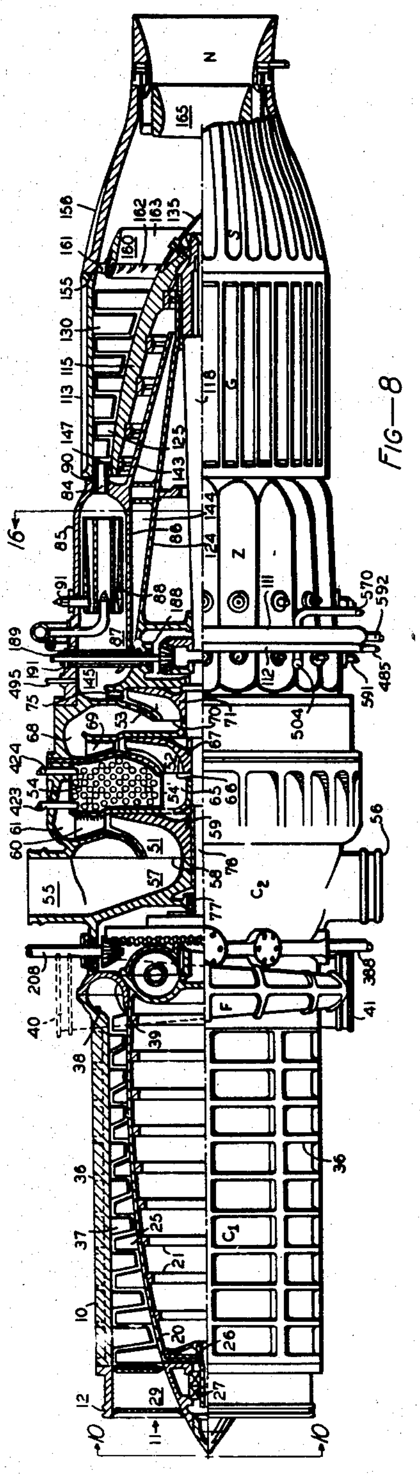
Figure 8 is an elevation in partial cross-section of the general assembly of the power plant unit of the invention.
Figure 27:
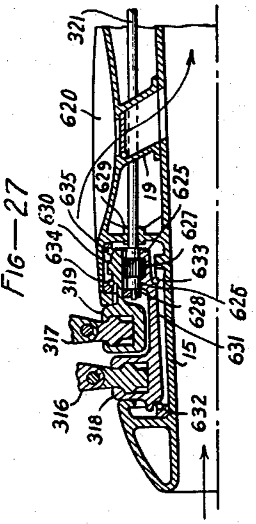
Figure 27 is an enlarged fragmentary cross-sectional view taken on line 27—27 of Figure 1.
Figures 17, 18, 19:
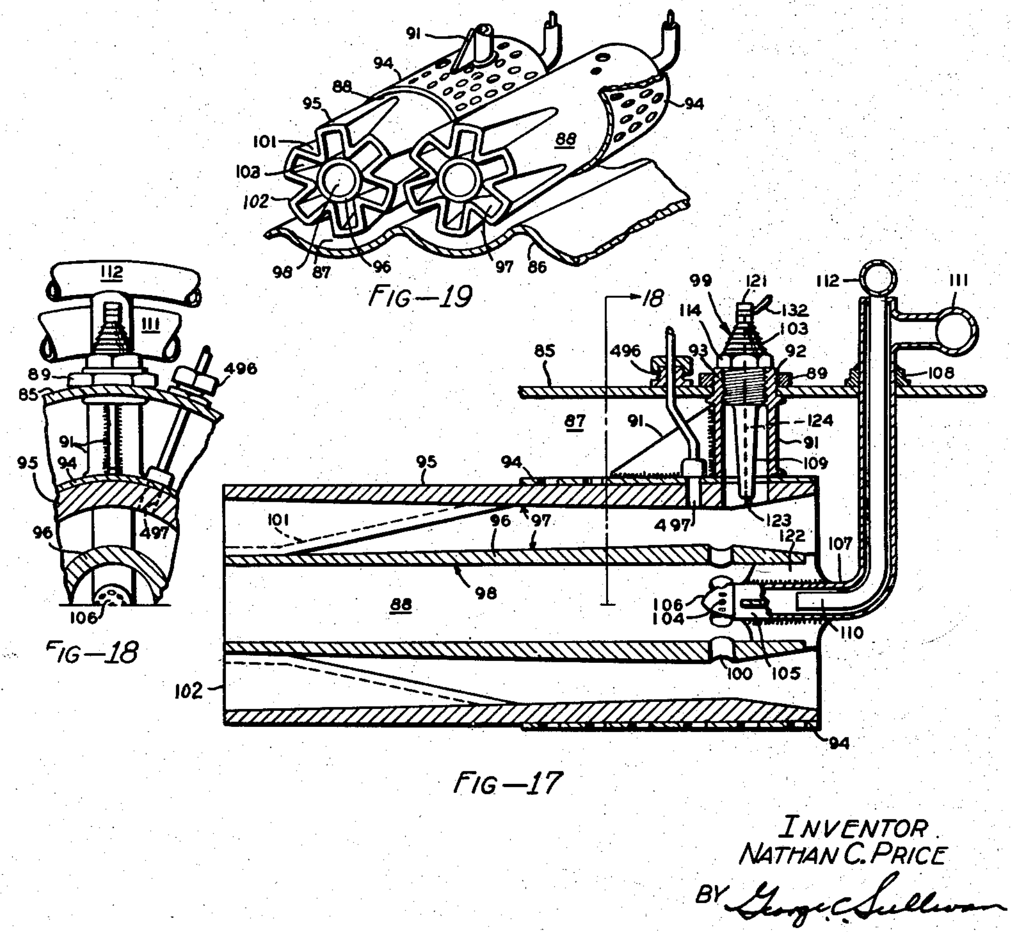
Figure 17 is an enlarged detailed longitudinal cross-section taken on line 17—17 of any one of the burner tubes of Figure 16.
Figure 18 is a fragmentary cross-sectional view taken at line 18—18 of Figure 17.
Figure 19 is a perspective view of a pair of the burner tubes of Figure 16.
Figure 20:
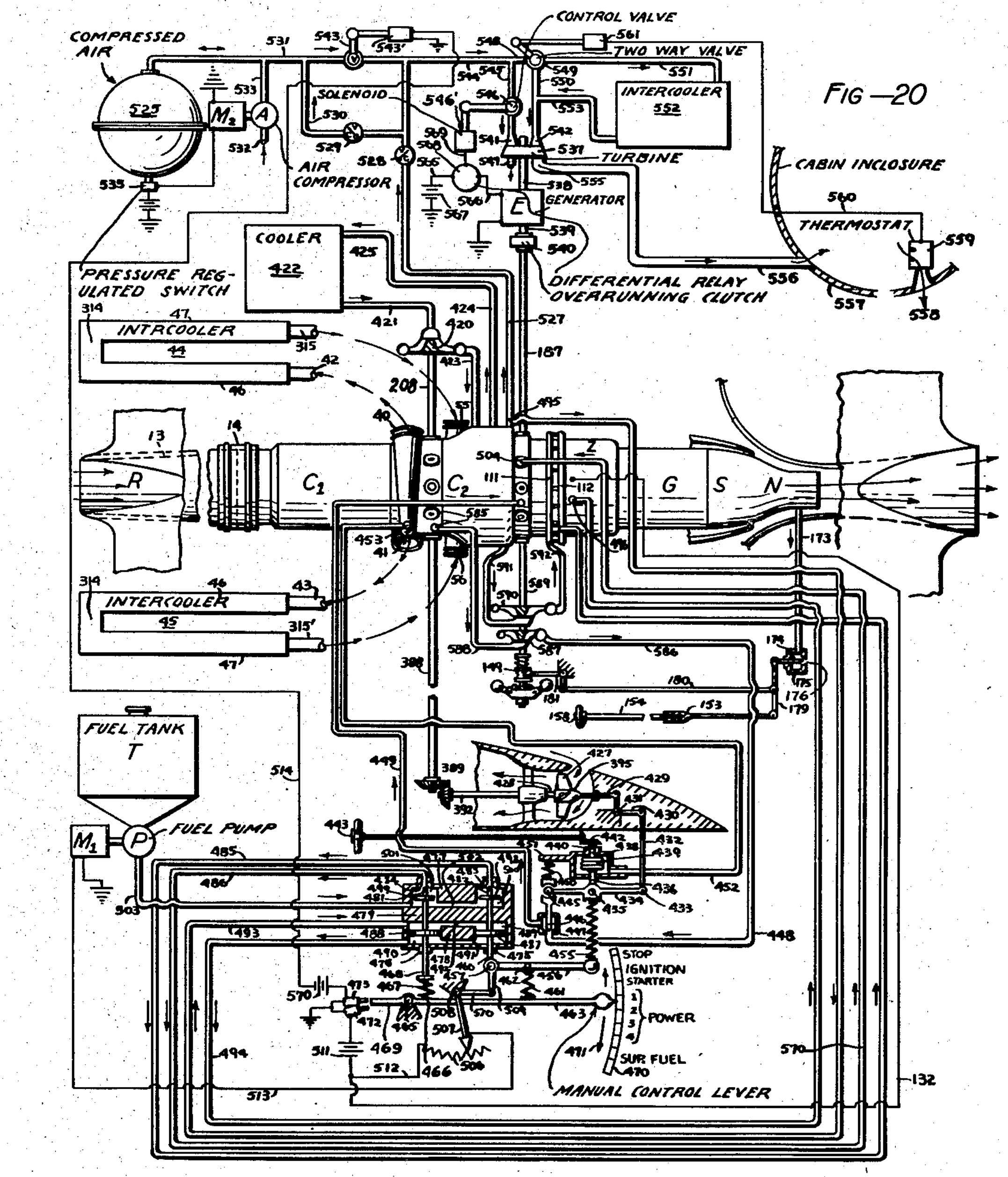
Figure 20 is a typical flow diagram for the installation of the power unit of Figure 8 in an airplane or airplane wing.

The subject power plant, operating at high altitude in air of extremely low density, must necessarily handle a great volumetric air flow. It is thereby essential that the inlet of the blower system of the power plant be made unusually large and that it have a very high compression efficiency at the same time. Therefore, at the leading end of the jet power plant as shown in Figure 8, a cylindrical housing 10 is provided for the multi-stage axial blower $C_1$ which constitutes the first stage air compressor. The housing 10 is provided at the forward end with an annular opening 11 defined by a grooved spigot 12, both of which are of substantially full axial blower diameter and to which a forwardly directed conical ram 13 comprising a tubular conduit of truncated conical shape may be semi-flexibly attached by means of a short flexible coupling 14 as best shown in Figure 20 and also as shown in modified form at 14', 15—16 in Figure 2 and 17—18 in Figures 4 and 6. This ram normally extends out of the leading end of the fuselage or the leading edge of the wing according to the type of installation and faces forward into the relative airstream with the open end of smallest diameter foremost, whereby intake air may be caught and initially compressed in the ram by impact affected by the high velocity of the air relative to the aircraft under flight conditions prior to its entrance into the beforementioned axial blower. The ram may be provided with auxiliary shuttered openings as shown at 19 in Figures 1 and 2 to increase the effective inlet opening of the ram for admission of additional air when the airplane is operating at low speed as at take-off or as in a steep climb. These auxiliary shuttered openings as shown at 19 extend laterally, forming passageways communicating between the ram 15 and the outside surface of the fuselage by way of the slots 620 and 621 into which the foldable propeller blades are adapted to be housed. As described more fully hereinafter, the lateral ducts 19 are provided with spring loaded check vanes which automatically close them against outward passage of air when the pressure inside of the ram is higher than the atmospheric pressure adjacent the outside surface of the fuselage in the vicinity of said propeller housing slots. When the pressure in the ram is less than that surrounding the fuselage the vanes are adapted to automatically open under the differential air pressure and to allow passage of additional air into the ram.

Figure 14:
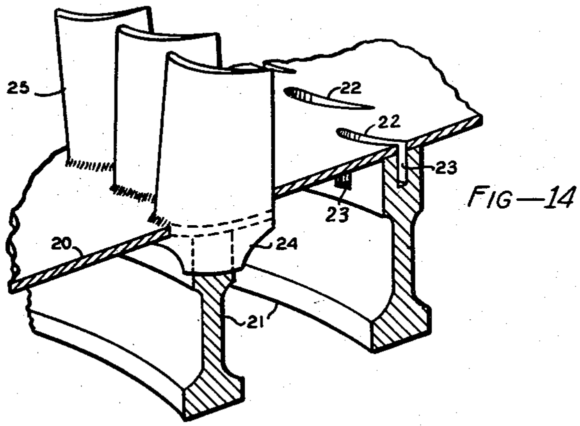
Figure 14 is an enlarged detail view of an axial blower blade showing the method of attachment to the rotor.

The rotor shell 20 of the axial blower $C_1$ has a form which may be defined approximately as a truncated, prolate spheroid, and is constructed, preferably, from a relatively thin metal tube spun to the desired shape. A plurality of axially spaced reinforcing rings 21 of suitably varying diameters are attached to the inside surface of the rotor shell 20 by suitable means such as by welding and furnace brazing, one such ring preferably being positioned opposite each row of the plurality of rows of impeller blades 25 and adapted by suitable slotting in the rotor as shown at 22 and in the said ring as best shown at 23 in Figure 14, to receive the inwardly extending impeller blade shanks as shown at 24. The said rotor shell 20 is provided with axially spaced rows of the slots 22 which are shaped to fit the contour of the curved impeller blades and to position them at their proper angles. The rings serve in operation to carry the concentrated centrifugal forces of the blades, and to insure circularity of the rotor while at the same time permitting the rotor shell to be made of relatively thin material, 78 carries a bevel gear 82 which constitutes a portion of the counter-rotation transmission through which it is driven by the gas turbine G, also as more fully described hereinafter.

Figure 16:
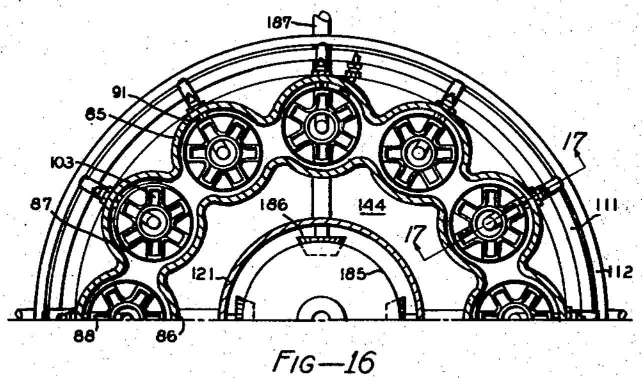
Figure 16 is a partial cross-sectional view taken on the line 16—16 of Figure 8 showing the arrangement of the fuel burners.

The before mentioned combustion chamber Z into which the final stage compressor discharges, is an approximately annular space defined on the outside by the housing 85 and on the inside by a shroud 86, both preferably fabricated from a heat resistant alloy such as nickel-chromium-iron. The said outside housing 85 and inner shroud 86 are formed with adjacent and oppositely facing ogee curves which together form in effect a series of sidewardly interconnected, parallel cylindrical pockets or barrels 87 having their axes equidistant from and parallel to the axis of the power unit and adapted to house the plurality of cylindrical burner tubes 88 as best shown in Figures 16, 17 and 19. The substantially annular combustion chamber Z, comprising said pockets or barrels, converges at the rear end to an annular nozzle ring 90 of reduced cross-sectional area and containing in the portion of reduced area a plurality of circumferentially spaced vanes as shown at 84 in Figure 8. The said combustion chamber nozzle ring 90 serves to hold a back pressure upon the combustion chamber and to efficiently discharge hot gases at high velocity from the combustion chamber into the expansion zone of the gas turbine G.

The before mentioned burner tubes 88 are each coaxially positioned and rigidly supported within each of the combustion chamber pockets 87 by means of a streamlined tubular strut as shown at 91 which passes radially out through the combustion chamber shell 85 and is retained in gastight connection therewith by means of external nuts 89 threaded at 92 to the outwardly projecting portion 93 of the said struts. The inner end of the said strut makes welded connection with a perforated cylindrical sleeve 94 in which the burner tube 88 is firmly gripped. The perforated sleeve 94 and strut 91 are preferably constructed of a heat resistant metal alloy such as nickel-chromium-iron.

The burner tubes which are preferably constructed of a refractory material such as Carborundum, are as previously stated, cylindrical in general form but are constructed as best shown in Figures 17 and 19 of two concentric tubular portions 95 and 96 which together form an intermediate annular passageway 97 having an approximate Venturi shape as viewed in longitudinal cross-section, and an inner straight cylindrical passage 98. The Carborundum can withstand a temperature of 3500° F. In case a thermal fracture should develop in the Carborundum the air-cooled perforated sleeve 94 serves to hold the fractured parts together.

The outer tubular wall 95 of the burner is formed with a plurality of external V-shaped flutes of variable depth as shown at 101 which extend upward and vanish at a point about half the length of the burner from the rear or outlet end 102. The inner surfaces of the V-shaped flutes make contact at their inner vertices with the rear portion of the before mentioned inner tubular portion 96 of the burner and form in conjunction therewith a plurality of circumferentially spaced outlet openings as best shown at 103 in Figure 19. Concentric support for the rear end of the said inner tube 96 is also thus provided.

A plurality of radially directed holes, as shown at 100, pass through the inner tubular portion of the burner at the throat portion of the Venturi section.

Fuel spray nozzles extend concentrically for a short distance into the forward ends of each of the before described burner tubes as shown at 105 and each nozzle carries at the inner end, a spray head 106 provided with peripherally spaced perforations 104 adjacent and coaxially directed with respect to the before mentioned holes 100 leading into the annular combustion passages. The said spray nozzles communicate with and are supported by air injection tubes 107 which extend laterally through suitable flanged inlet connections 108 provided in the rear portion of the combustion chamber housing 85. These air injection tubes make connection through suitable manifolding 111 to a source of compressed air; and centrally positioned within the air injection tubes 107 and extending to a point close to the nozzle head is a fuel injection tube 110 which makes external connection through a manifold 112 to suitable fuel supply pumps and regulators hereinafter described in connection with the flow diagram of Figure 20. The fuel spray nozzles are each provided with a spider comprising a number of relatively thin radially positioned webs as shown at 122 adapted to fit snugly into the inside of the forward portion of the inner burner tube 96. The said spider thus serves as a positioning and centering support for the forward end of the inner burner tube. Certain features of the fuel injection means herein described are covered in my copending application Serial No. 579,757, filed February 26, 1945, which issued as Pat. #2,526,410.

Making threaded connection into each of the outer end portions 93 of the burner tube struts 91 which extend outside of the combustion chamber housing 85 is a glow plug 99 which serves as the igniting means for the combustible fuel-air mixture which is formed in and flows through the burner tubes. The glow plug is constructed with a threaded metal bushing portion 114 surrounding an elongated central refractory insulating body portion having an inwardly projecting tapered shank 109 extending through the strut 91 to the throat of the burner tube, and an outwardly extending ribbed insulating portion 103 carrying a terminal 121. A small filament or coil 123 of high melting point wire such as platinum, supported upon the inner end of the body portion of the plug is electrically connected through a central conductor bar 124, terminal 121 and a conductor wire 132 to a suitable source of low tension electric current hereinafter more specifically described in connection with Figure 20. The refractory body portion of the glow plug may be composed of Carborundum, mica or the like insulating materials.

The described combustion chamber portion of the power plant is adapted to burn fuel efficiently over an unusually wide mixture range, in a very small space employing to the utmost degree the advantages of surface combustion. Here the fuel is uniformly dispersed prior to leaving the nozzles and the gases of combustion formed in the burner tubes are properly mixed with the excess air. The high temperatures are localized at the Carborundum surfaces within the burner tubes which are adapted to withstand heat whereas the outer casing and fuel spray nozzles, which are exposed only to the air stream, remain comparatively cool.

18 gage chromium steel for example, to reduce weight. The thin walled rotor shell reinforced by the internal rings to which the blades are secured form the subject matter of my co-pending application Serial No. 788,350, filed November 28, 1947, which issued as Patent No. 2,501,614, March 21, 1950.

Figures 11, 12, 23:
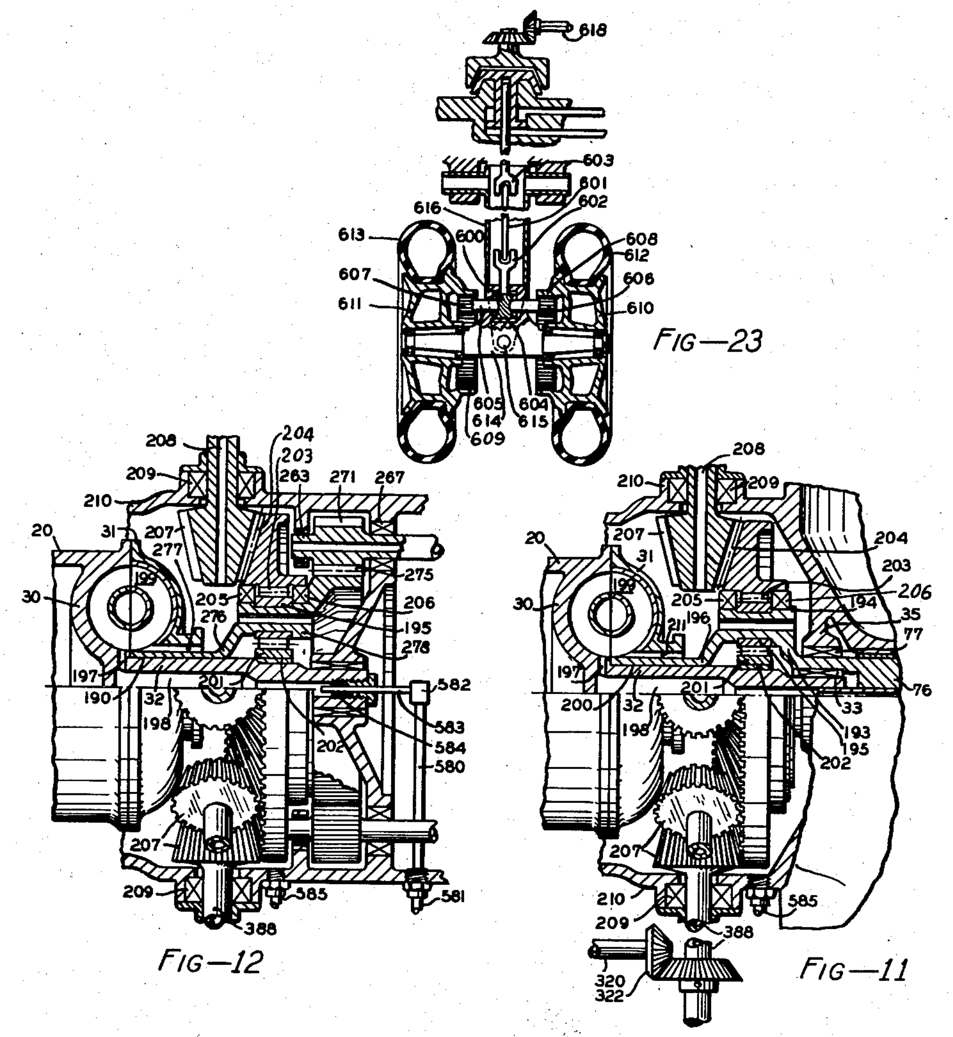
Figure 11 is an enlarged detail view in partial cross-section of the axial blower differential accessory drive transmission for the arrangement of Figure 8.
Figure 12 is an enlarged detail view in partial cross-section of the axial blower differential accessory drive transmission for the optional arrangement of Figure 9.
Figure 23 is a fragmentary front elevation of a typical landing gear drive installation as may be employed in Figure 4.
Figure 10:
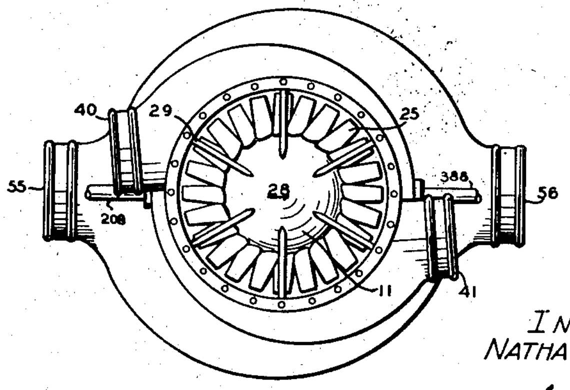
Figure 10 is a frontal view of the unit taken at line 10—10 of Figure 8.

The forward end of the axial blower rotor 20 carries a coaxially positioned, forwardly extending hollow spindle 26 with which it is rotatably supported in suitable bearings 27 which are in turn supported within the streamlined forward bearing housing 28. This forward rotor bearing housing 28 is supported and centrally positioned within the axial blower housing inlet spigot 12 by means of a plurality of interconnecting radially disposed, streamlined struts as best shown at 29 in Figure 10. The struts, in addition to their structural function, serve as air straightening vanes to prevent uncontrolled swirl of air at the inlet of the blower, thereby increasing efficiency of compression. The rear end of the rotor shell 20 is closed by the inner formed half 30 of the housing of a fluid coupling unit F which in turn carries a coaxially positioned rearwardly extending spindle 32 as best shown in Figures 11 and 12. The fluid coupling structure thus serves as part of the rotor structure, thereby conserving weight and space. Furthermore, in operation, heat developed in the coupling is carried off by indirect heat exchange with the air being discharged from the blower. The said spindle 32 is rotatably supported in suitable needle bearings 33 within the end of shaft 76 which is in turn rotatably supported centrally within the power plant housing by means of bearing 77 carried in a suitable lateral diaphragm or web 35.

The axial blower housing 10 carries on the inside a plurality of rows of inwardly extending, radially disposed, stationary diffuser vanes 37 arranged to stand intermediate the rows of impeller blades 25 and fitting with small clearances between said blades and said rotor shell. This housing, which may be fabricated or cast of a light weight metal such as a magnesium alloy, is provided on the outside with a plurality of relatively deep intersecting, laterally and longitudinally disposed ribs 36 for the purpose of imparting sufficient stiffness thereto to maintain impeller-vane clearance to close tolerances.

The inner exhaust end of the axial blower terminates in a split, double scroll outlet housing 38—39 having a pair of outlet spigots 40 and 41 which lead through suitable couplings 42—43 to suitable intercoolers which may be arranged in the airplane wings as shown at 44—45 in Figures 1, 2 and 4 to 7 and also as shown diagrammatically in Figure 20, and hereinafter more particularly described.

Advantages residing in the hereinbefore described arrangement and construction of the axial blower are the flexibility of control and relatively high adiabatic efficiencies of which the unit is capable, such efficiencies ranging from 85 to 90 percent. This construction also results in a unit which is light in weight and small in frontal area relative to the large quantity of air it is capable of handling and supplying to the subsequent stages of compression.

The axial blower rotor is driven through a planetary transmission and a fluid coupling as best shown and hereinafter described in connection with Figures 11 and 12.

Located in the intermediate portion of the power plant and immediately to the rear of the axial blower transmission is the second stage air compressor unit $C_2$ which is preferably of a high speed multi-stage radial flow or centrifugal blower type as shown in Figure 8. This centrifugal blower comprises three additional stages of centrifugal compression 51, 52 and 53 in tandem arrangement with a liquid fed intercooler 54 intermediate its first and second stages. This type of compressor with its integral cooler lends itself to diametrally compact and short coupled construction and is adapted to high efficiency operation upon the dense air fed from the first stage compressor after passing through the wing surface cooler. Furthermore, the series of radial flow impellers in tandem as shown, offers a number of intermediate annular spaces in the main casing, which are ideal from the air flow standpoint for the incorporation, if desired, of additional liquid fed intercoolers which may be constructed and arranged similar to that shown at 54.

A pair of inlet nozzle connections 55 and 56 serve to receive the first stage compressed air from the before mentioned wing intercoolers and to introduce it through the annular chamber 57 to the inlet 58 of the first centrifugal impeller 59. A plurality of stationary diffuser vanes 60 receive the compressed air from the impeller 59, and annular chamber 61 serves to direct the flow of air therefrom to the inlet of the said liquid fed intercooler 54 which is more fully described hereinafter. The outlet 65 of the intercooler 54 communicates with the inlet 66 of the second centrifugal blower impeller 67 and the annular shaped chamber 68 formed in the body of the unit in turn serves to direct compressed air leaving impeller 67 after passing through the stationary diffuser vanes 69, to the inlet 70 of the third and final centrifugal compressor impeller 71. Air from the final stage impeller 71 passes through stationary diffuser vanes 75 to the entrance of the combustion chamber Z.

This beforementioned liquid cooled intercooler 54 is preferably constructed of a continuous metal tube wound in the form of a compact multi-layer helix the turns of which are coaxially positioned with respect to the axis of the unit and with the turns spaced relative to one another by means of a plurality of perforated radially positioned fins, the whole being adapted to fit snugly in the annular chamber formed in the blower housing intermediate the first centrifugal stage discharge 61 and the second centrifugal stage inlet 65.

Similarly constructed intercoolers may be placed in the centrifugal blower housing intermediate each of the centrifugal blower stages.

Cooling is effected by circulation of a suitable liquid coolant such as ethylene glycol through the intercooler coils and through a suitable heat exchanger external to the blower as hereinafter mentioned in connection with Figure 20 in the description of the operation.

The said three centrifugal blower impellers 59, 67 and 71 are fixed to a common shaft 76 which is rotatably journaled at its forward end in bearing 77 as best shown in Figure 11 and at the rear end in bearing 78. Bearings 77 and 78 are supported coaxially within the body of the centrifugal blower portion of the power unit by suitable diaphragms or webs 35 and 80 respectively. The forward extension of the centrifugal blower shaft 76 couples into the axial blower and accessory transmission in a manner more fully described hereinafter. The rear end of the shaft end of the cylinder 168 is provided with a bleed duct 172 connected through tubing 173 with a bleed control valve body 174 which may be located at any convenient place within the airplane structure. The said bleed control valve 174 comprises a stem 175 having a needle point 176 adapted, when closed, to rest upon a beveled valve seat 177. The valve bleed is vented to atmosphere at 178. The said needle valve stem 175 is operatively connected through suitable linkage comprising lever 179, rod 180 and bell crank 181 to a fly-ball speed governor 149 which may be driven from one of the gas turbine accessory drive shafts such as indicated at 589 whereby an increase or decrease of turbine speed will act through the said governor 149, to respectively increase or reduce the needle valve opening. The lever 179 is pivotally supported at 152 upon a threaded shaft 153 by means of which the speed setting of the governor with respect to the needle valve action can be adjusted through a shaft extension 154 by means of a wheel 158 which may be conveniently located in the flight compartment.

The movable annular throat member 165 is so shaped that its axial displacement resulting from the speed responsive pressure variation in cylinder 168 as influenced by the action of the needle valve bleed 174 as controlled by the governor 149 results in an effective change of nozzle area, at the same time maintaining streamline and high nozzle efficiency. The above described nozzle means forms the subject matter of my co-pending application Serial No. 734,649, filed March 14, 1947, now abandoned.

Adjacent the trailing edge portion of the inner divergent portion of the nozzle N is an external, concentrically positioned annular jet augmenter member 182 having inner walls convergent at 183 and divergent at 184 matching in contour that of the fixed divergent inner portion of the said nozzle N. The said augmenter member 182 is adapted to be supported by suitable means from the body of the power unit or from the airplane fuselage or wing in which it may be installed as illustrated in Figures 1, 2, 4 and 6 and as hereinafter more fully described. Under certain flight conditions the augmenter increases thrust as much as 25 percent.

Figures 25, 26:
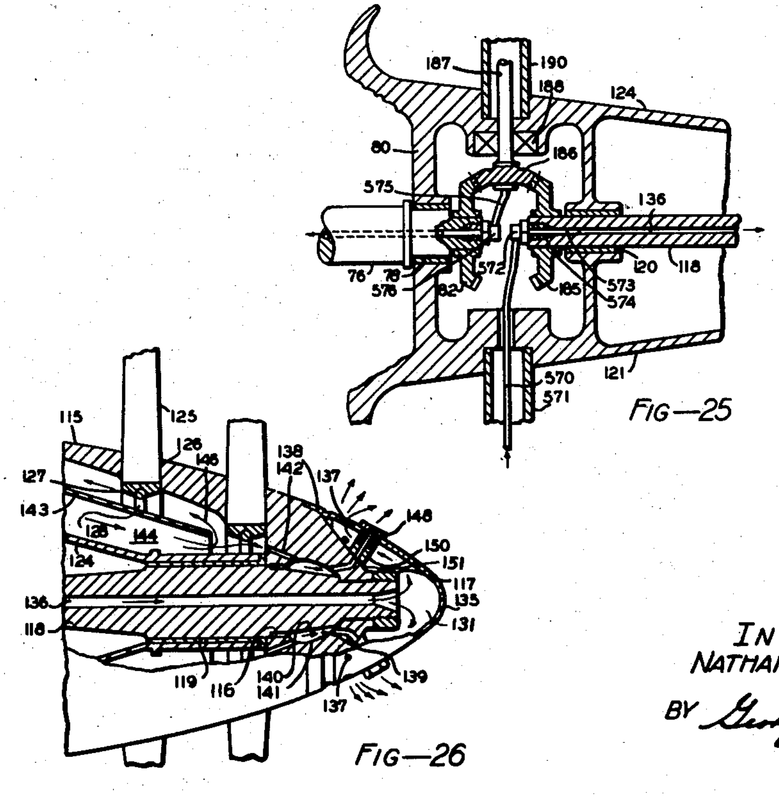
Figure 25 is an enlarged fragmentary cross-sectional view of the counter-rotation transmission of Figure 8.
Figure 26 is an enlarged fragmentary cross-sectional view of the apex of the gas turbine showing the supplementary fuel jets and other details.

Power is adapted to be transmitted from the gas turbine to the radial and axial blowers and to the various auxiliary drive shafts throughout the unit through suitable gear transmissions which comprise the following apparatus:

Referring primarily to Figures 8, 11 and 25, the forward end of the hollow gas turbine shaft 118 carries fixed at a point just forward of the bearing 120, a bevel gear 185 which meshes with a plurality of bevel pinions as shown at 186, each splined to the inner end of a radially positioned auxiliary drive shaft as shown at 187 in Figure 25 and at 187 and 589 in Figure 20. The said auxiliary pinion drive shafts are each rotatably supported upon a pair of suitable bearings as shown at 188 and 189 and a number of such shafts as required are arranged to pass radially through the forward portion of the combustion chamber through tubular housings 190 and out of the combustion chamber housing through stuffing boxes as indicated at 191.

Fixed to the rear end of the radial blower shaft 76 and adjacent the bearing 78 is a bevel gear 82 which also meshes with the before mentioned bevel pinions 186. Shafts 76 and 118 are thus adapted to counter-rotation with respect to one another, through the action of the transmission comprising bevel gears 185 and 82 and bevel pinions 186.

A pipe 570 for supplementary fuel, enters the combustion zone housing as shown at 504 in Figure 20 and extends radially through a tubular housing 571 not occupied by an auxiliary drive shaft to a centrally positioned angle fitting 572 adjacent the forward end of the gas turbine shaft 118. A tube 573 extends from the said angle fitting 572 through a packing gland 574 and into the central bore 136 of the said shaft. An oil line 575 similarly makes connection at 576 with the central bore of the centrifugal compressor shaft 76 by way of which lubricating oil may be introduced under pressure through the rear, axial blower shaft 32 and into the fluid coupling by way of opening 197 in the housing as best shown in Figure 11.

Referring now primarily to Figure 11 which shows, in enlarged detail, the type of axial blower transmission employed in the unit of Figure 8, the centrifugal compressor shaft 76, as before stated, is rotatably journaled at the fore and aft ends in bearings 77 and 78 respectively. The shaft 76 makes connection just forward of the bearing 77 through a conical flange 193 with a planetary drive spider 194 which carries therein six parallel shafts upon which are rotatably mounted six planetary pinions as shown at 195. A further extension 196 of the shaft 76 forward of the planetary drive spider 194 enters the fluid coupling housing 30—31 and carries fixed on the end thereof the fluid coupling impeller 199. The just mentioned forward shaft extension 196 makes a rotatable fit over the rear axial blower shaft 32 at 200. A laterally directed drilled hole 197 is provided interconnecting the fluid coupling housing with the bore 198 of the rear axial blower shaft 32 through which oil may be introduced under suitable pressure into the said coupling. Annular clearance 211 between the outside of shaft 32 and the coupling housing entrance is provided for continuous escape of oil from the coupling unit.

The before mentioned planetary pinions 195 mesh with an inner sun-gear 201 which is keyed to the axial blower spindle 32 at 202 and they also mesh with an outer planetary ring gear 203 formed on the inside diameter of the bevel accessory drive gear 204. The ring like unit comprising the bevel gear 204 and the planetary ring gear 203 are rotatably supported upon the outside shoulders of the planetary spider 194 by means of a pair of suitable ball bearings 205 and 206. The bevel gear 204 meshes with a plurality of bevel pinions as shown at 207 which are carried on radially positioned outwardly extending accessory drive shafts as shown at 208 which are rotatably supported in suitable bearings 209 carried in the transmission housing 210. The said outwardly extending accessory drive shafts make external connection with auxiliary variable speed apparatus as more fully described in connection with the auxiliary apparatus and controls of Figure 20. An oil scavenging line for withdrawal of oil discharged from the fluid coupling enters the bottom of the transmission housing at the lowest point as shown at 585.

Figure 9:
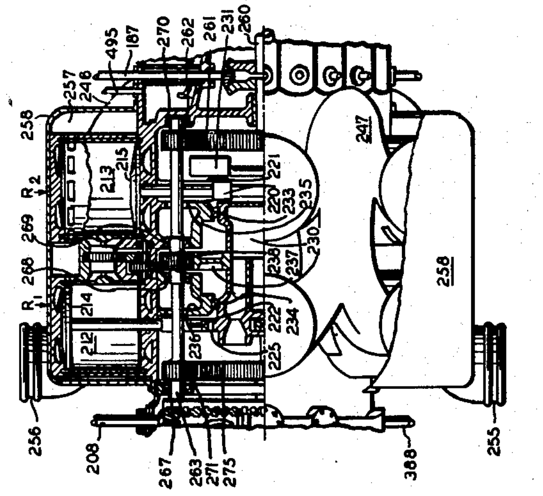
Figure 9 is an alternative arrangement of a portion of the unit of Figure 8.

In Figure 9 a radial, multi-cylinder type of final stage compressor is illustrated which may be optionally substituted in the unit of Figure 8 in place of the before described radial blower. This compressor has similar characteristics to the previously described tandem arranged centrifugal The gas turbine G which is contained within a cylindrical housing 113 comprises a tapered rotor 115 having the approximate shape of a portion of an extremely prolate spheroid and being coaxially positioned within the power plant with the end of minimum diameter facing rearwardly in the direction of flow of the propellant gases. The said rotor 115 is splined at 116 and bolted at 117 to the rear end of a hollow, tapered shaft 118 which is in turn rotatably supported concentrically within the power unit upon a pair of shaft bearings comprising a forward bearing 120 and a rear bearing 119. The rear turbine rotor shaft bearing 119 is supported by means of a hollow truncated cone shaped cantilever member 124 which is attached at its forward end of largest diameter to the transverse bulkhead web 80 which separates the final stage compressor housing from the combustion zone and gas turbine housing.

Figure 15:
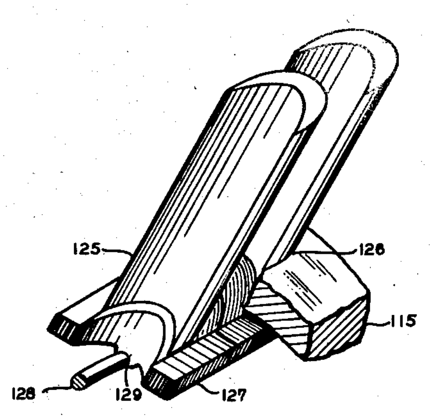
Figure 15 is an enlarged detailed view of blades of the gas turbine showing the method of attachment to the rotor.

The gas turbine rotor is provided with a plurality of rows of impeller blades or buckets as shown at 125 in Figures 8, 15 and 26, which may be constructed from heat resistant, high strength alloy such as nickel-chromium-iron. The said turbine rotor blades 125 are adapted to be inserted from the inside and to make a light press fit through suitably shaped openings 126 broached in the rotor shell 115, and during operation to be held firmly in place against shoulders 127 by centrifugal force. Internal, circular snap rings 128 adapted to lie in suitable grooves 129 formed along the inside ends of the blade root shoulders serve to hold the blade shoulders firmly in seated position in the rotor at all times.

The plurality of gas turbine stator blades as shown at 130 and which extend radially inward intermediate the before described rows of impeller blades are attached by welding at their outer root ends to the interior surface of the cylindrically shaped turbine housing 113.

At the apex of the turbine rotor, a conical cap member 135 encloses a space 131 into which fuel may be injected under pressure by way of a bore 136 within the hollow turbine shaft 118. The said conical cap is provided with a plurality of divergingly directed orifices 137 equispaced in its periphery and adjacent its end of greatest diameter where it meets and makes oiltight connection at 138 with the rotor body 115. Injection of supplementary fuel at this point greatly increases the thrust of the power plant by efficiently distributing added fuel to burn the excess air leaving the gas turbine wheel and about to enter the main propulsive nozzle. My co-pending application Serial No. 578,302, filed February 16, 1945, which issued as Patent No. 2,479,777, Aug. 23, 1949, is directed in part to the injection of fuel from the apex portion of the turbine rotor.

The thrust output of the power plant is enhanced by operation with relatively high temperature gases entering the gas turbine. The limitation of temperature has a structural basis. The gas turbine can operate in a higher temperature range than that of conventional turbines because of the structural provisions and cooling arrangements provided.

A truncated cone shaped baffle 143 is provided as a rearward extension of the inner shroud 86 of the before mentioned combustion chamber Z. The tapering annular-like space 144 thus formed between the conical shaped outer turbine bearing support 124 and the said inner combustion chamber shroud 86 and the baffle 143 serves to conduct cooling air under suitable pressure from the annular forward end of the combustion chamber at 145 to the inner apex of the turbine rotor adjacent the bearing 119 and thence counter-current to the propellant gases in the turbine as shown by arrow 146 back along the inner surface of the turbine rotor 115 and in contact with the inner ends of the rotor blade roots 127 to the openings in an annular cooling air nozzle ring 147 which is immediately inside of and concentric with the gas turbine nozzle ring 90. A plurality of drilled ducts as shown at 142 are provided for conducting a portion of the cooling air from the inside of the rotor to the annular cooling cavity 139 formed between the taper 140 adjacent the end of the turbine rotor shaft and an adjacent relieved concavity 141 in the turbine rotor. A plurality of exhaust nozzles 148 are provided for exhausting cooling air from the cavity 139 into the secondary combustion chamber S and are in the form of drilled cap screws which pass through suitable holes in the cap 135 and make threaded connection into nipples 150 which are welded at 151 to the turbine rotor body. The said nozzles thus also serve to retain the cap 135 in oiltight position on the apex end of the turbine. The turbine cooling system forms the subject of my copending application, Serial No. 573,562, filed January 19, 1945.

Figures 22, 24:
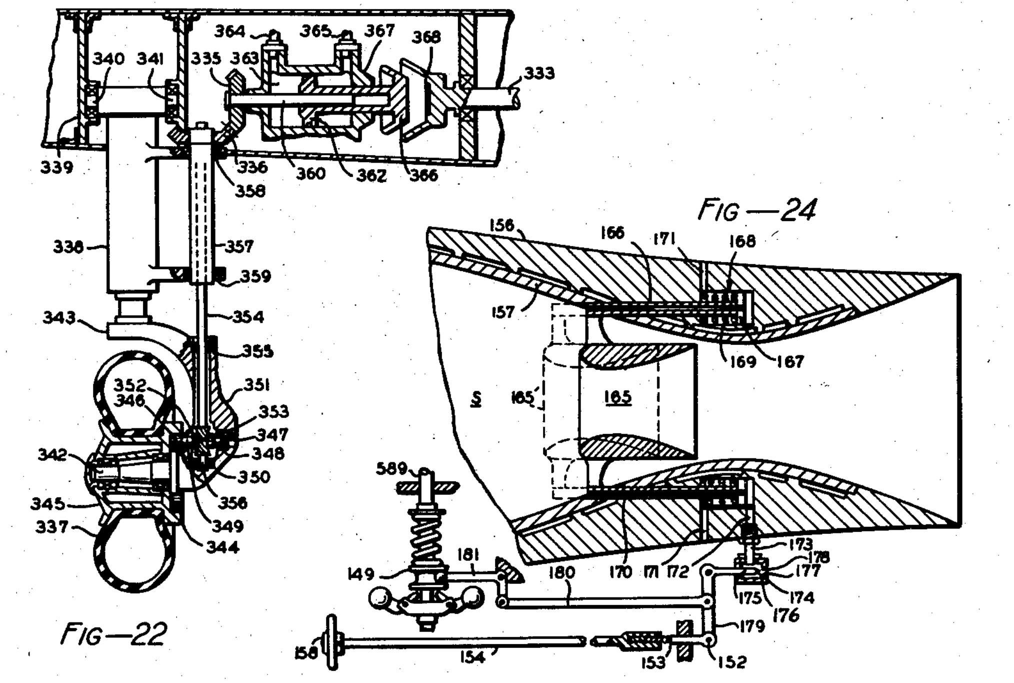
Figure 22 is a fragmentary front elevation of a typical landing gear drive installation as may be employed in Figures 2 and 3 and arranged to cooperate with the power plant.
Figure 24 is an enlarged fragmentary cross-sectional view of the variable opening nozzle shown in Figure 8.

Immediately to the rear of the gas turbine and attached at 155 to the gas turbine housing, is the secondary combustion chamber S and nozzle section N which comprises an approximately Venturi shaped housing 156 carrying a refractory lining 157 which may be Carborundum or the like material, as best shown in Figure 24. The secondary combustion chamber is shaped to utilize the kinetic energy of the residual gas velocity from the turbine wheel so that it is additive to the kinetic energy of the propulsive jet.

An annular baffle 160 having a streamlined section similar to that of an airfoil is concentrically supported adjacent the gas turbine exhaust within the entrance to the secondary combustion chambers and diametrically opposite the secondary fuel orifices 137 in the rotor cap 135 by means of a plurality of radially directed interconnecting streamlined struts 161. This baffle is preferably constructed with a leading edge portion 162 of heat resistant metal such as a nickel-chromium-iron alloy and a body and trailing edge portion 163 of Carborundum or the like refractory material.

The nozzle portion N is provided with an inner longitudinally movable annular throat member 165 supported upon a plurality of parallel, axially positioned rods 166 which extend through and make a sliding fit in suitable holes in the nozzle lining and are fixed at the inner ends to an annular shaped servo piston 167 located within an annular shaped servo cylinder 168 in the nozzle body as best shown in Figure 24. The piston 167 and annular throat member 165 are urged rearwardly by means of a number of coil springs 169 acting under compression against the forward or rod side of the said annular piston.

The said parallel axially positioned rods 166 upon which the annular throat member 165 is movably supported, are provided with coaxial bores as shown at 170 which extend through the servo piston 167 and thus provide pressure equalizing passages through which gases from the chamber S can enter the working end of the cylinder 168. The rod end of the said annular cylinder 168 is provided with a plurality of atmospheric vent ducts as shown at 171. The head 198 of the hollow axial blower shaft 32 and thence through the lateral passage 197 into the fluid coupling housing 30—31.

The balance of the axial blower transmission is identical with that employed in connection with the radial blower and hereinbefore described in connection with Figure 11.

Figure 1:
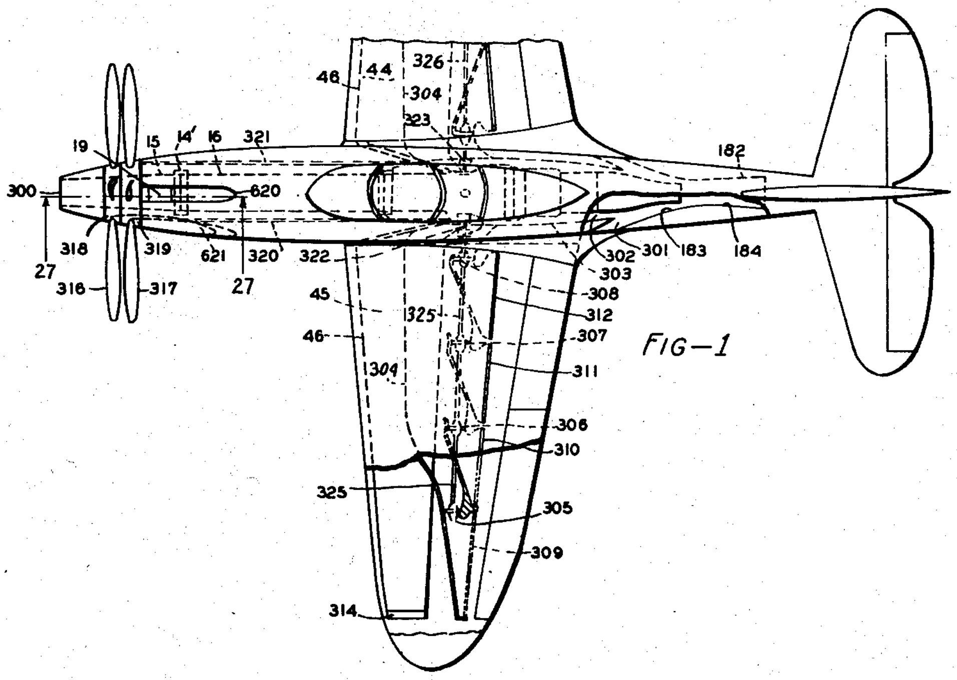
Figures 1 and 2 are general plan and side elevational views showing a typical installation of the invention in an airplane fuselage of an airplane equipped with foldable take-off propellers, landing wheel power drive, and wing boundary layer removal fans.
Figure 2:
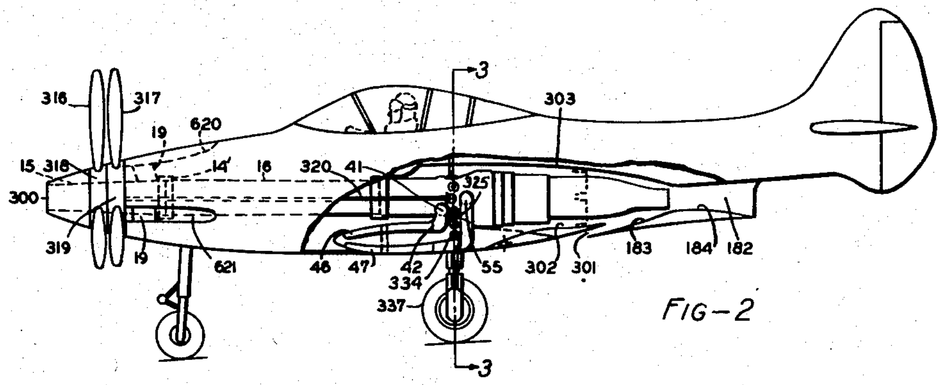
Figure 3:
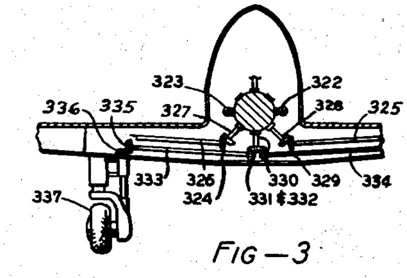
Figure 3 is a cross-sectional view taken on line 3—3 of Figure 2.

Referring now principally to Figures 1 to 3 in which a typical installation is shown, $RC_1C_2ZGSN$ indicate the relative positions of the various components of the power unit as located within the fuselage substantially coaxial with the thrust line of the airplane. The power plant is preferably isolated from the airplane structure by hoses or rubber pads or other resilient means to prevent transmission of high frequency sound (whine) to the aircraft structure. The isolation is not needed, however, for balance reasons because all the elements of the power plant may be in essentially perfect dynamic balance. The leading end spigot 12 of the axial blower $C_1$ makes semi-flexible connection at 14 as by a short reinforced neoprene hose for example, to a tubular extension conduit 16 which in turn makes semi-flexible connection at 14' to the rear end of the conical ram 15. The forward end opening of the ram 15 extends through the foremost end of the fuselage as shown at 300.

The nozzle S of the unit is positioned to discharge rearwardly through a Venturi shaped jet augmenter member 182 having a forwardly convergent portion 183 and a rearwardly divergent portion 184 faired into and forming the lower rearward portion of the fuselage. An air duct 301 of semi-annular extent and opening inwardly through the fuselage skin forms the forward lower exposed edge of the forward portion 183 of the augmenter member 182. The balance of the forward portion of the augmenter member 182 also communicates through an annular duct 302 with the confined space around the power unit defined by a shroud 303 which in turn makes lateral connections with the inner lateral passages 304 within the wings which lead through the plurality of fans as shown at 305—308 from the boundary layer removal slots 309—312 which open through the top skin of the wing.

The axial blower outlet spigots 40 and 41 each make connection through suitable conduits as shown at 42 and 43 to wing skin intercoolers 44 and 45 which are positioned spanwise in the wings. Each skin intercooler comprises an airtight outflow and a return flow portion 46 and 47 interconnected at 314 and preferably founded in part by a portion of the upper and lower wing skins respectively and adapted thereby to permit heat exchange directly through those portions of the wing skin to the relative air stream flowing in contact with the outside surface thereof. The pressure of the air discharged from the axial blower is sufficiently low to permit it to be confined in this manner directly in suitable portions of the wing structure, as for example, in corrugations directly underlying the skin. Thus the air can be intercolled to a temperature close to that of the wing-air boundary layer. The said return portions 47 of the wing intercoolers make connection through ducts 315 and 315' with the inlet spigots 55 and 56 of the second stage compressor $C_2$.

As shown in Figures 1 to 3, at the forward end of the fuselage and surrounding the ram 15 a pair of propellers 316 and 317 are rotatably mounted upon hollow hubs 318 and 319 and adapted to counter-rotation through suitable gearing by means of a pair of parallel shafts 320 and 321 which extend forward along the sides of the power unit. These parallel shafts are driven through bevel gears as shown at 322 and 323 in Figures 1 and 3, from laterally extending auxiliary shafts such as those shown at 208 and 388, which enter the axial blower transmission as hereinbefore described in connection with Figures 11 and 12. The forward ends of the shafts 320 and 321 terminate in straddle types of pinions as shown at 625, 626 and 627 supported by bearings shown at 628 and 629. The centrally positioned pinion 627 meshes with a ring gear 630 which serves to drive the rearmost propeller hub 319, and the outer pinions 625 and 626 mesh with a divided ring gear 631 which serves to drive the forward propeller hub 318 in a direction counter to that of hub 319. The foremost hub 318 and divided gear 631 are rotatably carried upon suitable ball bearings 632 and 633 and the rearmost propeller hub is rotatably carried on a pair of suitable ball bearings as shown at 634 and 635. Recesses 620 and 621 are provided in the nose of the fuselage to receive the propeller blades when they are folded and inoperative. These propeller shafts, and also the shafts used for driving landing wheels or boundary layer removal fans, are adapted to operate at high speeds, and thus may be very small in diameter and light in weight. For example, these shafts may be approximately ¾" in diameter and operated at speeds of approximately 40,000 R. P. M. It has been found that such shafts can be used without difficulty from torsional vibration due to the smooth drive from the gas turbine.

The series of boundary layer removal fans 305—308 contained in suitable housings provided in each wing are rotatably carried on laterally extending lay shafts 325 and 326 which are driven from obliquely extending auxiliary drive shafts 327 and 328 through suitable bevel gears 324 and 329, as shown in Figure 3.

A lateral auxiliary drive shaft 330 extending vertically from the lower side of the unit is coupled through bevel gears 331 and 332 to a pair of oppositely extending shafts 333—334 which, acting through bevel gears at 335 and 336 and suitable clutching mechanism hereinafter more fully described in connection with Figure 22, serve to transmit rotative power from the power unit transmission to the main landing gear wheels 337 for assisting in take-off and ground maneuvers.

In Figure 22 an enlarged detail view of the power driven, retractable landing gear of Figures 1 to 3 is shown. The shock absorbing strut cylinder 338 is pivotally connected at the top to internal structure 339 of the wing by means of a pair of trunnions 340 and 341. The landing gear wheel 337 is rotatably mounted upon an axle 342 which is supported horizontally beneath the shock absorbing strut by means of a yoke 343. A wheel drive ring 344 provided with internal teeth, forms an integral part of the wheel hub 345 and is adapted to mesh with a drive pinion 346. The said drive pinion 346 is fixed upon the outer end of a horizontal pinion stub shaft 347 which is rotatably journaled in a pair of bearings 348 and 349 on either side of the gear box opening 350 formed in the enlarged portion 351 of the yoke 343. Splined to the central portion of the pinion shaft 347 and within the gear box compressor with liquid intercoolers inasmuch as it is adapted for a high compression ratio in a small space and at high efficiency of air which is already comparatively dense. In installations where liquid type intercooling is more difficult to carry out, the multi-cylinder compressor will be preferred. However, in general, the centrifugal compressor with integral liquid fed intercoolers will offer the advantage of simplicity and use of only rotating parts.

Figure 13:
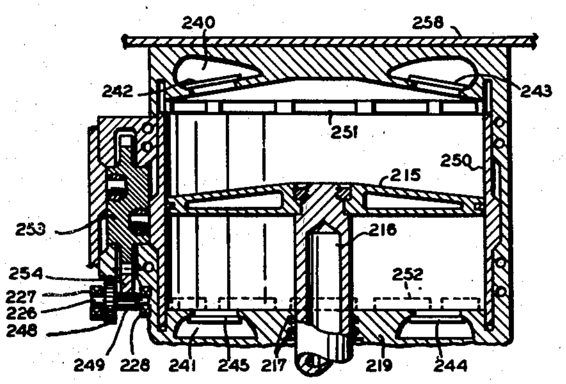
Figure 13 is an enlarged fragmentary detail view of a compressor cylinder of Figure 9.

The multi-cylinder compressor is provided with a double row arrangement of a plurality of radially disposed cylinders as shown at $R_1$ and $R_2$ of Figure 9, one of such cylinders being shown in the enlarged longitudinal cross-sectional view of Figure 13 and two opposite cylinders, 212 and 213 of the two adjacent rows $R_1$ and $R_2$ being shown in cross-section in the longitudinal cross-sectional view of Figure 9. The pistons, as shown at 214 and 215 are carried on the outer ends of hollow piston rods, as best shown at 216 in Figure 13, which pass through suitable stuffing boxes as shown at 217 in the inner heads 219 of the cylinders. The said pistons are thus adapted to be double acting, each performing two compression strokes per piston cycle and operate at about 5,000 R. P. M. in a representative case.

The inner ends of the piston rods terminate in cross-heads, as shown at 220, which are adapted to reciprocate within suitable radially positioned cross-head guides 221 carried within the body of the compressor crankcase. The connecting rods 222 make pivotal connection with the cross-head wrist pins at their outer ends, and with pin bearings at their inner ends in a suitable floating link collar 225. Due to the symmetrical arrangement of the cylinders and the use of double acting cylinders, racking forces on the collar 225 are small, particularly at high speed, hence the collar may be permitted to float on the crank pin.

In some cases a positive mechanism, not shown, may be provided to insure uniform motion of the collar, as for example abutments on the link rods, which contact the collar at a period of maximum rod angularity. The crankshaft 230 is provided with suitable counter-balances as shown at 231 and is carried on two crankshaft main roller bearings 233 and 234 which are supported within the crankcase on suitable webs as shown at 235 and 236 in Figure 9. Fixed to the crankshaft intermediate its main bearings 233 and 234 is a crankshaft drive gear 237 which is driven by means of four lay shaft pinions, one of which is shown at 238.

The cylinder heads for both ends of the compressor cylinders are provided with passage ways or ducts as shown at 240—241 in Figures 9 and 13, leading from the discharge valve ports as best shown at 242 to 245 in Figure 13, to the compressed air outlet manifolding as shown at 246 and 247 in Figure 9. The discharge ports may be provided with any suitable type of valve such as the well-known automatic spring feather valves commonly used in air compressors.

The inlet valves to the compressor cylinder are preferably of the sleeve type as shown in Figure 13 to insure large induction area without increasing clearance volume. The sleeves 250 which are adapted to move over the inlet ports 251 and 252 provided around the periphery of the cylinders adjacent the cylinder heads, extends the full length of the cylinders and is adapted to be actuated and reciprocated by a valve gear of the Argyle type as shown at 253. One Argyle valve gear positioned between each pair of cylinders in adjacent rows serve to actuate the two valve sleeves. The Argyle valve gears of all of the cylinders are driven by means of a common ring gear 254 of a large diameter surrounding the crank case between the cylinder rows, and the said ring gear is in turn driven from a pair of the before mentioned central lay shaft pinions, one of which is shown at 238, and through a pair of gears 248 and 249 of suitable gear ratio and rotatably mounted upon a common spindle 226 journaled upon a pair of suitable bearings as shown at 227 and 228.

The inlet ports 251 and 252 of the compressor cylinders open directly into the enclosed space 257 formed around the cylinders by the shroud 258. Inlet spigots 255 and 256 are provided entering the shroud 258 for feeding first stage compressed air from the external intercoolers to the shroud enclosure and thence to the inlet ports of the cylinders for the final stage of compression. Such a compressor may provide a ratio of compression of 9 to 1, for example.

When the piston type of final compression, as just hereinbefore described is employed, the forward end of the gas turbine shaft 118 counter-drives a stub shaft 260 which carries a driving gear 261 which in turn meshes with four rear lay shaft drive pinions, one of which is shown at 262 in Figure 9. Each of the lay shaft drive pinions is in turn carried on four lay shafts one of which is shown at 263. The lay shafts pass through the compressor crankcase and are each rotatably supported upon four sets of bearings as best shown at 267, 268, 269 and 270 in Figure 9. The central lay shaft pinions mesh with the compressor crankshaft drive gear hereinbefore mentioned.

The forward four lay shaft pinions, one of which is shown at 271, mesh with the axial blower transmission drive gear 275 which is fixed to the planetary drive spider 278 and rotatably supported at 190 upon the axial compressor spindle 32 by means of a hollow concentrically positioned shaft 276. The said hollow shaft 276 passes forward through an opening 277 in the rear housing 31 of the fluid coupling unit F and carries therein the fluid coupling impeller 199 before mentioned and shown in connection with the mechanism of Figure 11.

The planetary drive spider 278 carries a plurality of parallel, axially positioned shafts upon which the planetary gear pinions 195 are rotatably mounted. The said planetary pinions 195 mesh with the planetary ring gear 203 on the outside and a sun-gear 201 on the inside. The planetary ring gear 203 is rotatably mounted upon the outside shoulders of the planetary spider 278 by means of a pair of ball bearings 205 and 206 and the sun-gear 201 is splined at 202 to the before mentioned axial blower spindle 32. The ring gear 203 carries fixed thereto a bevel gear 204 which meshes with the plurality of bevel pinions 207 which are rotatably supported upon radially directed shafts as shown at 208, in suitable bearings as shown at 209. The shafts extending radially from these bevel pinions serve to drive various accessories as hereinbefore described in connection with Figure 11.

With this arrangement of the transmission, lubricating oil is introduced under pressure into the fluid coupling through a pipe 580 which enters the housing at 581, and thence through an angle fitting 582 and through a tube 583 extending through a packing gland 584 into the bore horizontally and oppositely directed auxiliary shafts 288 and 388 and obliquely extending auxiliary shaft 617 and 619 extending from the axial blower transmission. These auxiliary shafts make driving connection through suitable gearing as shown at 389, 390 and 391 in Figures 4 and 5 and one of which is as illustrated at 389 in Figure 20, with the plurality of the before mentioned longitudinally positioned drive shafts 392 to 394 of the boundary layer removal fans 395 to 397. The auxiliary shaft 288 makes driving connection with one or more centrifugal coolant circulating pumps as shown at 420. The suction of said coolant pump 420 connects through suitable piping 421 with the outlet connection of a cooler 422 not shown in the figures but which may be located in any suitable position within the fuselage or wing and preferably adapted to effect heat exchange from the coolant to the air stream through the fuselage or wing skin. The discharge from the coolant circulation pump connects through pipe 423 with the inlet of the surface intercooler 54 in the centrifugal blower housing. The coolant outlet 424 of the said surface intercooler is connected to the inlet of the cooler 422 through pipe 425. Ethylene glycol or the like fluid may be employed as the circulated coolant material.

The pressure of the air in the second stage compression portion of the power plant is so high that it can not be readily transmitted directly to the airplane structure without weight penalty. Furthermore, the loss of high pressure air would be considerable through any small leaks which might occur. For these reasons and also to avoid air ducting pressure losses, the liquid type intercooler is advantageous for the high pressure air region of the power plant. In some installations for military purposes the liquid type intercooler may be used also at the discharge of the axial blower. From a tactical standpoint the liquid intercooler is particularly desirable because if it is punctured by gun fire only the intercooling is rendered ineffective, and no air is lost. Hence the power plant can continue to function at somewhat reduced efficiency.

The boundary layer removal fans as shown at 395 are provided with blades 427, the pitch of which are adapted to be varied over a wide range by means of suitable gearing contained in the fan hub 428 and which may be arranged as disclosed in United States Letters Patent No. 2,294,350. Accordingly, said fan blade pitch varying mechanism in each hub is adapted to be actuated by means of push-pull rods which enter the front point of the hub 428 coaxially as best shown at 429 in Figure 20. Inward and outward motion of the rod 429 moves the fan blades to positions of smaller or greater angles of incidence relative to the air upon which said blades act when in rotation. A bell crank 430 pivotally supported within the airplane wing at 431 serves to reciprocably link said push-pull control rod 429 with rod 432 which is in turn pivotally connected at 433 with the outer end of a lever 434. The central pivot 435 of the said lever 434 is pivotally carried at the lower end of a rod 436 which extends out through a stuffing box in the wall of a closed chamber 438. The said rod 436 makes connection at its inner end with the free end of a closed Sylphon bellows 439. The opposite, or relatively fixed end of the said Sylphon bellows 439 is carried on the lower end of a threaded adjustable rod 440 which extends upward and out through a stuffing box in the upper wall of the chamber 438. The top of the rod 440 is rotatably connected through suitable gearing 442 to a manual adjusting means 443 which may be located in the flight compartment of the airplane.

The end of lever 434 opposite to pivot connection 433 makes rotatable connection by means of a suitable ball and socket joint 445 to the outer end of a needle valve stem 446 of a needle valve 447 adapted to be closed upon extended downward movement of said stem. Pipes 448 and 449 make connection with the inlet and outlet connections respectively of said valve.

A spring 450 normally acting under compression, extends between the upper end of the needle valve stem joint 445 and a fixed portion 451 of the bellows chamber 438.

The interior of the bellows chamber 438 is connected by tubing 452 to one or both of the axial blower outlet scrolls as shown at 453 whereby the Sylphon bellows 439 is subjected on the exterior thereof to air pressure corresponding to that of the said axial blower discharge.

The central pivotal portion 435 of the lever 434 is elastically coupled by means of a coil spring 455 to one end of a horizontal lever 456 which makes pivotal connection at the opposite end 457 with the outer end of a primary fuel valve piston rod 460. A coil spring 461 serves as an elastic linkage between an intermediate point 462 of the lever 456 and a control lever 463 which may be located in the flight compartment in such position as to be conveniently manually operated by the pilot or flight engineer in a manner similar to the conventional engine throttle. In case the pilot or flight engineer's control station is remote from the power plant control accessories, the throttle control lever 463 may be actuated from such remote station through suitable linkages or cable controls, not shown.

The above mentioned throttle control lever 463 is pivotally supported at 465 upon a suitable member of the airplane structure.

At a point 466 on the control lever 463 intermediate the attachment point of the before mentioned spring 461 and the lever pivot 465, a second coil spring 467 normally acting under compression makes an elastic linkage to the outer end of a secondary fuel valve piston rod 468. An extended portion 469 of the control lever 463 is adapted upon rotative movement of the control lever 463 along the sector 470 in the direction of the arrow 471 to first actuate the ignition and fuel pump switch 472 and then the starter switch 473 in succession.

The before mentioned primary and secondary fuel valve piston rods 460 and 468 enter through stuffing boxes 475 and 476 into the fuel valve housing 477, and are reciprocably supported and guided therein by an intermediate divisional wall 479 through which they slidably pass in a liquid and gas-tight fit. The inner ends of the piston rods 460 and 468 terminate in needle points 481 and 482 which are adapted, in the closed positions, to seat upon corresponding beveled outlet valve seats 483 and 484 from which outflowing fuel pipes 485 and 486 extend.

The said piston rods 460 and 468 carry a pair of pistons 487 and 488 fixed thereto at an intermediate point which make fluidtight sliding fit in a pair of cylinder bores 489 and 490 formed within the lower half of the valve housing 477 and interconnected at both ends by ducts 491 and 492. Air pressure and vacuum connections leading to the upper and lower interconnected heads of said cylinder bores by means of which a dif- 350 is a helical gear 352. The helical gear 352 meshes with a helical pinion 353 carried upon a drive shaft 354 which extends parallel with the axis of the landing gear strut through a housing 355 on the outer face of the yoke and into the gear box 350. The lower end of the said shaft 354 is supported in a bearing 356 at the bottom of the gear box.

The upper portion of the shaft 354 makes a longitudinally slidable splined connection with the tubular shaft 357 which is rotatably supported from the cylinder 338 by means of a pair of bracketed bearings 358 and 359. Rotation is imparted from the before mentioned accessory shaft 333 to the landing gear strut shaft 357 through a cone clutch 368 and a movable clutching member 366 splined to a stub shaft 360 and bevel gears 335 and 336. The movable clutching member 366 carries a double acting piston 362 adapted to be reciprocated in a cylinder 363. Upon applying differential fluid pressure upon the piston 362 through pipes 364 and 365 the cone 366 may be moved into frictional engagement with either the stationary braking surface 367 or the driving surface of the clutch 368 carried on the end of the before mentioned accessory shaft 333. It will be apparent that to the described mechanical friction components there exist hydraulic or electromagnetic equivalents, such as hydraulic couplings which may be employed in essentially the same manner, thereby falling within the scope of the inventive idea.

Figure 5:
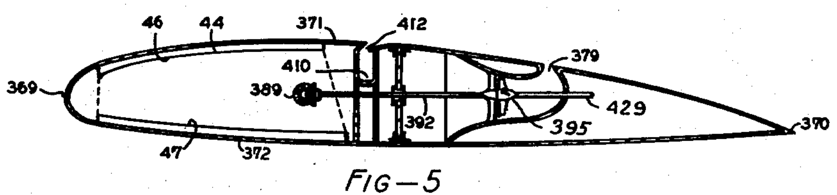
Figure 5 is a cross-sectional view taken on line 5—5 of Figure 4.
Figure 6:
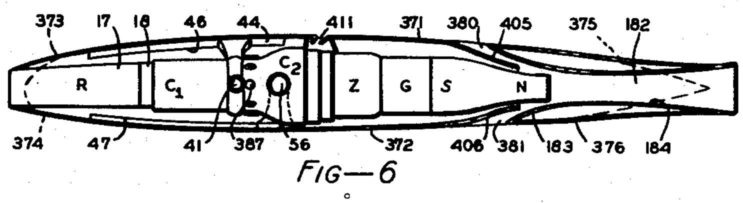
Figure 6 is a cross-sectional view taken on line 6—6 of Figure 4.
Figure 7:
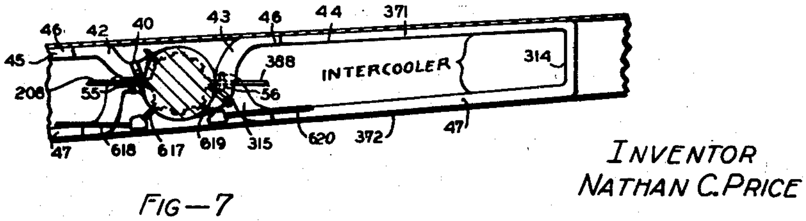
Figure 7 is a fragmentary sectional view taken on line 7—7 of Figure 4.

In Figure 23 an optional form of landing gear arrangement is shown more particularly suited to installation in a multi-motored aircraft of the type illustrated in Figures 4 to 7. Here the fluid actuated clutching and braking mechanism may be identical to that shown and described in connection with Figure 22 and may be driven through suitable gears associated with the auxiliary shafts 617, 618 and 619, 620 extending into the wings from the axial blower transmission of the unit as best shown in Figure 7. The driving power is thus transmitted through the laterally extending auxiliary shaft to a helical pinion 600 through a vertical shaft 601 having a pair of universal joints 602 and 603 to allow the gear to be retracted within the wing or suitable nacelle. The said helical pinion 600 meshes with a helical gear 604 which is fixed to the intermediate portion of a horizontal stub drive shaft 605. A pair of pinions 606 and 607 fixed on the ends of said shaft 605 serve to drive the ring gears 608 and 609 forming parts of the hubs 610 and 611 of the twin wheels 612 and 613. The axles for the twin wheels form a continuous truck member 614 which is laterally pivotally connected at 615 to the lower end of the shock absorbing strut 616 in such manner as to thereby equalize the loading on the wheels by allowing the wheels to follow irregularities in ground surface.

Figure 4:
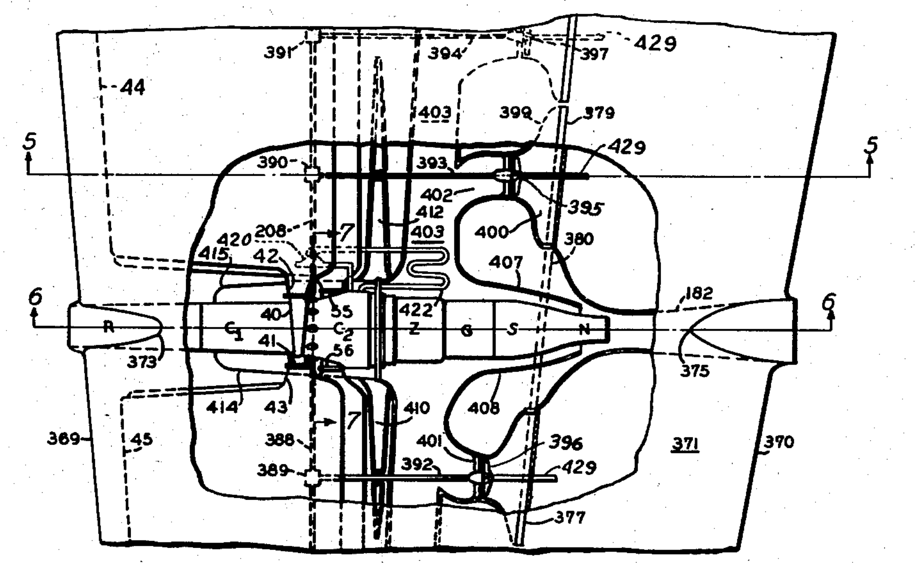
Figure 4 is a fragmentary plan view showing a typical installation of the invention in an airplane wing.

Referring now principally to Figures 4, 5 and 6, an illustration of a typical installation of the power unit within an airplane wing is shown. The leading and trailing edges of the wing are shown at 369 and 370 respectively, and the upper and lower cambered skin surfaces thereof at 371 and 372. The power unit $RC_1C_2ZGSN$ is shown submerged within the wing with its axis approximately on the chord line and perpendicular to the span of the wing. The forward end portion of the ram R emerges from the leading edge of the wing at 373 and 374 and the trailing portion of the nozzle augmenter 182 emerges from the upper and lower trailing edge portion of the wing skin at 375 and 376.

In the upper skin of the wing, boundary layer control slots may be provided as shown at 377 and 379 and both upper and lower surfaces with augmenter air duct slots as shown at 380 and 381 and more fully described hereinafter.

The outlet spigots 40 and 41 of the axial blower $C_1$ make connection through suitable curved ducts 42 and 43 to the outward flow passages 46—46 of the spanwise arranged wing skin intercoolers 44 and 45. The return passes 47—47 of the wing skin intercoolers 44—45 make connection through suitable curved ducts 315—315 to the inlet spigots 55 and 56 of the radial blower compressor $C_2$.

The two auxiliary shafts 208 and 388 laterally projecting from the axial blower transmission as shown in Figures 4 and 7, extend spanwise through the wing and make geared connections at 389, 390 and 391 with a plurality of longitudinally positioned shafts as shown at 392, 393 and 394 which are adapted to drive boundary layer removal fans 395, 396 and 397.

Each of the boundary layer removal fans 395—397 communicates on the suction side with the before mentioned boundary layer removal slots 377 and 379 through suitable passages within the wing defined by the upper and lower wing skins and intermediately positioned walls as shown at 399 and 400. The exhaust ends of the fans communicate through similarly formed conduits as shown at 401 and 402 with a spanwise extending passageway 403. The said spanwise passage within the wing into which the boundary layer fans exhaust communicates with the augmenter at the nozzle N through a substantially annular passage formed between the gas turbine and secondary combustion chamber housings G and S and the surrounding conically shaped baffle walls, the upper and lower sections of which are shown at 405 and 406 in Figure 6 and the side wall sections of which are shown at 407 and 408 in Figure 4.

The lateral air passage 403 may also communicate with a plurality of boundary layer control discharge slots opening through the upper skin of the wing as shown at 410—412. Walls 414 and 415 make an airtight seal around the forward part of the axial blower portion of the power unit whereby substantially the entire length of the unit can be contacted and cooled by air circulated by the boundary layer fans. Compared to suction slots, discharge slots increase the kinetic energy of the boundary layer rather than swallowing the stalled boundary layer. Both types of slots reduce the momentum of wing wake, thereby improving aerodynamic efficiency of the airplane. The boundary layer removal and control means and system form the subject of my copending application, Serial No. 572,924, filed January 15, 1945, which issued as Patent No. 2,514,513 July 11, 1950.

Referring now to Figure 20, a flow diagram illustrating the arrangement of suitable piping, manual and automatic controls, and auxiliary apparatus which may be associated with the power unit for its installation in an airplane, is shown. For convenience, the installation of the power unit of the preferred type illustrated in Figure 8 will be first considered in relation to the typical installation thereof in an airplane in the manner of Figures 4 to 7.

The power unit hereinbefore described and as shown at $RC_1C_2ZGSN$ is provided with a pair of and nozzle control valve 546. Opposite the nozzle 541 the air turbine exhausts to atmosphere through a suitable exhaust pipe shown at 547. The turbine nozzle 542 makes connection with pipe 544 through a branch pipe 548 and a two-way cock 549 which completes the connection either directly through pipe 550 to the nozzle 542 or through pipe 551 intercooler 552 and return pipe 553 to the said nozzle 542. The exhaust 555 from nozzle 542 may be connected through the pipe 556 to the cabin enclosure of the airplane, a fragment of the skin of which is illustrated at 557 in Figure 20. The before mentioned two-way cock 549 is adapted to be operated to direct flow of air from pipe 544 either through pipe 550 or 551 or to divide flow between them in accordance with the temperature of outflowing air at 558. The said control of cock 549 is accomplished by means of a temperature sensitive device such as a thermostat at 559 acting through a suitable coupling 560 and actuating device 561. The intercooler 552 is preferably of the skin surface type and may be located in any suitable place within the fuselage or wing structure where heat exchange with the air stream can be effected. The cabin air-conditioning system forms the subject of my copending application, Serial No. 575,913, filed February 2, 1945, which issued as Patent No. 2,438,-046.

The generator E is adapted to supply a charging current through conductors 565 and 566 to a suitable bank of storage batteries 567. A differential voltage sensitive switch 568 serves through suitable coupling 569 and valve actuating means such as a solenoid 546′ to actuate the nozzle control valve 546 in such a manner as to increase or decrease air supplied to the turbine in accordance with battery charging and electric accessory current needs. The differential voltage sensitive switch 568 is of a conventional voltage operated type and is so constructed and arranged as to energize an electromagnetically actuated means 546′ to open the throttle valve 546 when the voltage of the battery 567 drops below a predetermined value and to close the throttle valve 546 when the voltage of said battery rises above a predetermined value.

The operation of the apparatus of this invention primarily that shown in the installation of Figures 5, 6 and 7, following, for convenience, the sequency of operations from starting of the power unit to cruising conditions, is as follows:

The control lever 463 is first moved along the sector 470 from the "stop" position to the position indicated as "ignition." In so doing, the lever extension 469 actuates the ignition snap switch 472 to complete the low voltage electric circuit through the glow plugs by way of conductor 132 and return through the ground connection. The use of a low voltage ignition circuit of this type has the advantages of simplicity, freedom from creating radio interference, and efficiency, especially at high altitudes where corona losses and insulating difficulties are prevalent with the conventional high tension systems commonly employed for internal combustion engines. At the same time the fuel pump motor circuit is also closed by the same switch to complete the battery circuit from battery 511 through the rheostat 506 and the conductor 513. At this position the rheostat contact arm 507 is at a position on the resistance windings 506 of maximum resistance and corresponding minimum power input to the fuel pump. At this position the pump produces a comparatively small fuel pressure. When the filaments of the glow plugs have reached the ignition temperature of the gas fuel mixture to be subsequently introduced and the fuel pressure has come up to the starting pressure, the control lever 463 is then advanced to the "starter" position which acuates the starter switch 473 to complete the electrical circuit from the battery 570 through the conductor 514, the solenoid 543′ of the starter air valve 543 and return through the ground connections. This completion of the starter circuit results in opening the valve 543 and admitting air from the pressure flask 525 through lines 544, 545, and regulating valve 546 to the nozzle 541 of the air starter turbine wheel 537. This turbine wheel, which is designed particularly for starting with a relatively small flow of air may be relatively small in size for example it may be six inches in diameter and capable of delivering about 30 BHP. The resultant torque from the turbine wheel 537 is transmitted through the overrunning clutch 540 and shaft 187 to the intermediate pinion 186 as shown in Figure 25, which meshes with gears 185 and 82 and drives the gas turbine shaft 118 and the blower shaft 76 in counter-rotation with respect to one another. As soon as the turbine and the blowers are up to about 15 percent of normal speed sufficient air will be self-supplied by the blower and the compressor of the unit to the combustion chamber to establish an appreciable differential pressure in the pipes 493 and 494 which lead respectively to the point of discharge of the second stage compressor into the combustion chamber at 495 and to the Venturi section of one of the burner tubes as best shown at 497 in Figures 17 and 18. This said differential pressure is communicated to the fuel valve actuating pistons 487 and 488 in the interconnected cylinders 489 and 490 and is such as to tend to move the fuel control needle valves downwardly off their valve seats 483 and 484.

At the starter position of the control lever 463 on the sector 470, the spring 467 is under sufficient compression to hold the needle valve 484 firmly closed, but the compression in spring 461 is at this point so balanced that as soon as the flow of air through the burner tubes is established to a given value during the starter cycle, the above mentioned resultant differential pressure acting upon the piston 487 is sufficient to "crack" the needle valve 483 and allow a proper amount of fuel to flow through line 485 to the primary fuel jet manifold 112 and thence to the spray jets 106 in the burner tubes to initiate operation of the power unit. The unit is thus started and brought up to idling speed.

The unit thus becomes self-motoring at approximately 15 per cent of rated speed and a smaller amount of starting air is required than if air were released from the tank directly to the inlet of the gas turbine, the flow passages of which are obviously disproportionately large for starting purposes. At idling speed the overrunning clutch disengages the shaft 187 from the starter turbine 537 and the generator E preventing them from being driven at excessive speeds by the power unit.

Upon further advance of the control lever 463 from the starter position and along the power steps 1 to 4 of the sector 470 in the direction indicated by arrow 471, the compressive force of the spring 461 is further relaxed, tending to allow the primary fuel needle valve to open further and to feed a greater quantity of fuel to the ferential pressure can be established on the pistons 487 and 488 are shown at 493 and 494 respectively. The said pressure pipe connection 493 leads to the final stage air compressor discharge at the inlet 145 to the combustion chamber through an inlet nipple 495 through the combustion chamber housing and the vacuum pipe connection 494 makes connection through the combustion chamber housing at 496 to the Venturi section of one of the burner tubes as shown at 497 in Figures 17 and 18.

Carried on the before mentioned piston rods 460 and 468 adjacent the needle points 481 and 482 are another pair of pistons 498 and 499 respectively which make a loose sliding fit in cylinder bores 500 and 501 formed in the upper half of the valve housing 477 above the division wall 478. The lower head ends of the said cylinder bores 500 and 501 are interconnected by a duct as shown at 502 and are connected externally through a fuel supply pipe line 503 which leads from a pressure fuel feed pump P which in turn takes suction directly from the bottom of a fuel storage tank T to avoid possibility of suction line vapor lock. The upper head ends of the cylinder bores 500 and 501 are provided with centrally located outlet ports 483 and 484 which constitute the before mentioned beveled needle valve seats upon which the needle points 481 and 482 of the upper ends of the piston rods rest when in the closed position. The said outlet ports 483 make connection through the fuel supply pipe line 485 to the primary fuel burner nozzle manifold 112 and the outlet port 484 makes connection through the fuel supply line 486 to the combustion chamber housing at 504 and thence through the bore 136 coaxially positioned within the gas turbine shaft 118, to the supplementary fuel burner orifices 137.

A rheostat 506 having a common support with the fuel valve housing is adapted to be operated to vary the resistance thereof by means of a movable contact arm 507 pivoted at 508 and adapted to be actuated through a link 509 interconnecting the lower end of valve rod 460 and crank 510. The electrical circuit thus adapted to be varied is completed by means of the before mentioned ignition and fuel pump snap switch 472 through battery 511, conductor 512 and said resistance 506, through conductor 513 to the fuel pump motor $M_1$ and return by way of the ground connections shown. The electrical power input to the fuel pump drive is thus adapted to be varied as a function of the throttle setting and the fuel demand. At the same time a parallel circuit through the ignition glow plugs is completed by said switch 472 from battery 511 through conductor 132 and return through the ground connections. The fuel metering and powerplant control system herein described forms the subject matter of my co-pending application Serial No. 744,238, filed April 26, 1947, and the system for starting the powerplant forms the subject matter of my co-pending application Serial No. 615,167, filed September 8, 1945, now abandoned.

The before mentioned oil line 448 connects through pipe 586 to the outlet of a centrifugal oil pump 587 which takes suction through pipe 588 from the oil scavenging outlet connection 585 in the bottom of the axial blower transmission housing. The oil pump 587 is adapted to be driven by an auxiliary drive shaft 589 which extends laterally from the counter-rotation transmission of Figure 25.

Also driven by auxiliary shaft 589 or another suitable one of the auxiliary shafts extending from the counter-rotation transmission, is a centrifugal air booster pump 590 which takes suction through line 591 from the discharge of the final stage air compressor at its inlet to the combustion chamber. The pump 590 discharges through pipe 592 to the injection air manifold 111 leading to the fuel spray nozzles in the burner tubes as best shown in Figure 17. This insures improved atomization of the fuel and removes radiant heat from burner nozzle parts by convection.

Figure 21:
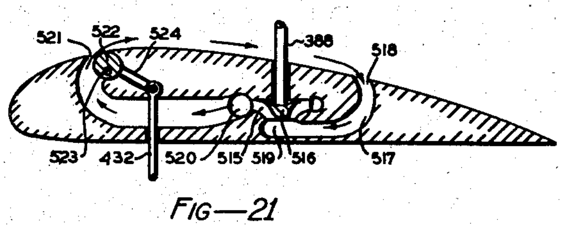
Figure 21 is a cross-sectional view of boundary layer control apparatus optional to that shown in Figure 20, and arranged to cooperate with the power plant.

Referring now to Figure 21, an optional form of boundary layer removal mechanism is diagrammatically illustrated which may, under certain circumstances, be desirable over that shown in Figure 20. Here the auxiliary shafts 208—388 extending from the transmission makes direct driving connection through suitable gearing with rotors such as shown at 515, of a centrifugal blower 516 suitably housed within the wing structure. A duct 517 connects a boundary layer removal slot 518 in the upper wing skin with the suction inlet 519 of the blower. An outlet duct 520 connects the discharge of the blower with a boundary layer control slot 521. A cylindrical valve 522 eccentrically rotatable about center 523 serves to reduce the area of the opening of slot 521 and to close it upon counterclockwise rotation to its extreme position and to open and increase the slot area upon clockwise rotation thereof. Rotation of said cylindrical valve 522 is effected by a lever 524 associated therewith and actuated through the link 432 by the pressure actuated mechanism hereinbefore described in connection with Figure 20.

The load characteristic of this system is such that as the rotary valve is closed the torque of the impeller becomes reduced, and a relatively high pressure air jet is formed at the control slot 521 to reenergize the boundary layer.

With further reference to Figure 20, 525 is a compressed air storage flask of spherical shape which is interconnected for charging, with the discharge of the final stage air compressor through nipple 495, pipe 527, check valves 528 and 529, and pipes 530 and 531 whereby air at final stage pressure of approximately 250 lbs. per square inch may be stored during operation of the power unit. An air compressor A electrically driven by a motor $M_2$ serves to compress air from an atmospheric intake 532 to a pressure of approximately 300 lbs. per square inch and deliver it through pipes 533 and 531 to the air flask 525 for stand-by service or initial starting purposes. The motor $M_2$ is controlled by means of a pressure actuated switching device 535 associated with the air storage flask 525 which functions to close the motor circuit to operate the air compressor when the air pressure in said flask falls below a predetermined value.

A high speed compressed air operated turbine wheel 537 is mounted on the drive shaft 538 of an electric generator E. The extension 539 of the generator shaft is coupled through an overrunning clutch 540 to the accessory drive shaft 187 which extends radially from the counter-rotation differential transmission as described hereinberfore primarily in connection with Figures 8 and 25.

The turbine wheel 537 receives compressed air through two nozzles 541 and 542. The nozzle 541 is connected to the air storage flask 525 through pipe 531, electric starter valve 543 which bypasses the check valve 529, pipe 544, branch pipe 545, and flows back along the inner surface of the turbine rotor shell 115 and in heat exchange contact with the inner ends of the rotor blade roots as shown at 127, and finally is exhausted to the gas turbine expansion zone inlet through the annular cooling air nozzle ring 147 which is positioned immediately inside of and concentric with the annular combustion gas nozzle ring 90 where it joins in laminar flow, the combustion gases issuing from the combustion chamber Z. The air thus flows from the annular inlet at the surface of the turbine rotor and forms a concurrently flowing layer of relatively cool air intermediate the hot propellant combustion gases and the outer surface of said rotor. This relatively cool boundary layer of air thus flowing along the outside surface of the turbine wheel serves to cool and to shield it and the blade roots from the high temperature gases.

Another portion of the air conducted to the inner apex of the gas turbine rotor adjacent the bearing 119 passes through the ducts 142 into the cooling cavity 139 and thence out through the discharge orifices 150 to the secondary combustion zone. Heat is thus carried away from the bearing 119 and from the massive apex portion of the turbine rotor.

That portion of the compressed air which passes through the clearance spaces between the burner tubes and the combustion chamber walls serves to cool both the chamber housing and the burner tube and to dilute the products of combustion, leaving the burner tubes sufficiently to limit the combustion chamber gases to a safe value. Another portion of the air passes through the central tubular passages 98 of the burner tubes and serves to cool the inner element thereof including the fuel spray tip and nozzle 105 and 106. That portion of the compressed air which passes through the Venturi shaped passages 97 of the burner tubes meets and mixes with the atomized spray of fuel issuing radially through the holes 100 in the inner tubular portion of the burner from perforations in the spray nozzle head 106. The resultant air-fuel mixture once ignited by the hot filament 123 of the glow plug 99 continues to burn throughout the length of the burner tube passages. The said burner tubes, as hereinbefore stated, are preferably constructed of Carborundum which, when heated, has catalytic properties which contribute beneficially to the rapidity and efficiency of the combustion process.

The heated gaseous combustion products and excess air of greatly expanded volume are continuously released from the combustion chamber at high velocity through the restricted opening formed through the annular nozzle ring 90 into the initial stages of the gas turbine expansion zone. The metal of the nozzle ring 90 is cooled to some extent by the expansion of cooling air in the adjoining cooling air nozzle ring 147, preventing thermal erosion.

The expanded and partially cooled gases from which a portion of the power has been extracted in passing through the gas turbine in the form of rotative torque applied to the turbine shaft 118, is discharged axially from the gas turbine expansion stages into the secondary combustion chamber S and thence out through the nozzle N in the form of a rearwardly directed and efficiently expanded high velocity reactive gaseous jet. The propulsive force exerted by the reaction of the gases leaving the said nozzle N is the thrust which is utilized in whole or in part to propel the unit and the aircraft with which it is associated.

When additional thrust is required and at certain times when maximum efficiency of operation of the unit is to be attained, more or less supplementary fuel injection into the secondary combustion zone S through the orifices 137 in a manner as hereinbefore described, is employed. Such supplementary fuel enters the secondary combustion chamber in the form of a fine spray of a mixture of vaporized and atomized fuel where it meets and mixes in most part with the high velocity gases issuing from the gas turbine, with the heavier particles of the unvaporized fuel spray reaching and impinging upon the inner surface of the annular shaped refractory baffle 160. Secondary combustion is thus promoted with the excess air associated with the said gas turbine exhaust gases. The said annular baffle 160 prevents the secondary combustion flame from directly contacting the inner lining of the combustion chamber and aids in the surface combustion of the liquid fuel particles which reach it.

The action of the variable throat member will be described hereinafter in connection with the before mentioned effects of variation in pressure altitude.

The reactive gaseous jet issues from the jet N into the throat of the Venturi shaped jet augmenter member having a forward convergent portion 183 and a rearward divergent portion 184 faired into and forming a portion of the fuselage as hereinbefore described and as best shown at 182 and 184 in Figures 1 and 2. In Figures 4 and 6, a similar augmenter member is shown at 183 and 184 faired into the wing. The augmenters act to draw air from the atmosphere through the fuselage slot 301 and from within the boundary layer removal fan ducts 304 of the wings, as shown in Figures 1 and 2, and from the wing slots 380 and 381 and also the boundary layer removal ducts as shown at 403, as shown in Figures 4 and 6. The effect of the augmenters is to assist the jet in the rearward acceleration of a greater reactive volume of air than it would otherwise be possible, and in addition to this the augmenter has the effect of decreasing the pressure at its throat adjacent the nozzle outlet, thereby increasing the velocity and correspondingly, the magnitude of thrust efficiency of the jet, particularly at the low relative air velocities associated with the starting and take-off conditions of the aircraft. The removal of air at the slots by the before mentioned ejector action of the augmenter also improves the flow condition of the wing by swallowing turbulent air flowing along the wing skin surface.

The transmission of power from the gas turbine to the compressor and auxiliary equipment is as follows:

The high speed rotation of the rotor of the gas turbine G is transmitted through the turbine shaft 118 and through the before described counter-rotation transmission to the shaft 76 of the second stage centrifugal compressor $C_2$. The accessory drive shaft 187, through which the unit is brought up to starting speed, as before described, extends radially from the said housing transmission and is driven by the bevel pinion as shown at 186. Another accessory drive shaft 589, similarly driven, extends radially from another convenient portion of the said transmission housing and serves to drive the before menburner jets. However, regulatory forces are immediately automatically superimposed upon the fuel control valve motion to meter the fuel permitted to flow to the burner jets in accordance with the quantity of flow of air through the combustion zone in order to insure a proper and efficient fuel air mixture and particularly to produce a nearly constant combustion temperature thereby limited to protect the gas turbine from thermal damage. These regulatory forces are applied to the needle valve stems, for example the primary fuel needle valve stem 460 in a direction tending to reclose the needle valve by means of the friction of the increased flow of fuel upward around the piston 498 and the force upon piston 487 is, as before mentioned, applied through pipes 493 and 495 and tends to move the needle valve to an open position. The force applied to piston 498 is thus opposed to that applied to piston 487 and tends to return the valve to a closed position upon flow of fuel through the cylinder, said force being caused by the differential pressure imposed upon the piston 498 by frictional flow of fuel through the small clearance between the piston and cylinder walls and towards the valve outlet 483. The flow of fuel from the primary fuel valve is thus a modified combined function of the rates of flow of fuel and air to the combustion zone, which tends under all conditions to maintain a proper fuel-air ratio for any given power control setting.

Up to this point in the initial stages of operation of the power unit the supplementary fuel needle metering valve 484 has remained inoperative and in a closed position under the compressive force of spring 467. As the control lever is still further advanced over the power settings on the sector and near the position marked Supplementary Fuel, the spring 467 reaches an elongation where its compressive force is reduced to a value permitting the supplementary fuel needle metering valve to lift off the valve seat 484 to allow supplementary fuel to flow through line 486, inlet fitting 504 in the combustion chamber housing, through pipe 570, fitting 572, tube 573 to the bore 136 of the gas turbine shaft 118 and thence to the supplementary fuel orifices 137 in the apex 135 of the gas turbine rotor. Supplementary fuel is thus sprayed into the secondary combustion chamber S from orifices 137 where it burns in the presence of the excess air carried in the gas turbine exhaust gases.

Still further advance of the control lever causes still further opening of the supplementary fuel valve 484 to supply an added quantity of fuel to the secondary combustion zone. The metering of the supplementary fuel is subject to the same automatic regulation as that before described in connection with the primary metering valve so that the total final quantity of fuel, both primary and supplementary, does not exceed that just required for the burning of all of the air leaving the gas turbine. Were it not for the flow controls described, raw fuel might be lost through the propulsive nozzle.

During the before described forward advance of the control lever 463, the rheostat has been actuated through the associated linkage hereinbefore described, to progressively decrease its resistance and thus to increase the power input to the fuel pump drive to produce a fuel pressure in line 503 which varies as an approximate function of the demand. The needle does not, in fact, appreciably throttle the fuel, but rather the fuel pump speed is directly controlled at the fuel source according to the fuel quantity requirement and the combustion air back pressure. The needle "trims" the flow to the exact quantity indicated with only small throttling action. This conserves electric power and prevents fuel vapor lock due to frictional overheating. Furthermore, this fuel pressure system makes possible the use of very small fuel lines since fuel pressure drop in lines is compensated for by the flow control. A further controlling factor is thus combined with the automatic characteristic of the fuel metering valve mechanism which tends to impart automatic regulatory characteristics to the unit as a whole. For example, in event the control lever is moved forward suddenly, an immediate increase in fuel pressure with momentary corresponding increase in flow to the burner will result. This momentary increase in flow of fuel will take care of the acceleration and increased primary and supplementary fuel requirements of the unit under high power output conditions.

The effect of the Sylphon bellows 439 and associated linkages including the spring coupling 455 to the lever 456 upon the before described fuel metering mechanism will be described hereinafter in connection with the description of the operation of the internal mechanism of the power unit, its auxiliary apparatus and the effects of variation of pressure altitude.

Assuming now that following the before described starting operations, a relatively low cruising speed of approximately 600 feet per second relative to the air at zero pressure altitude has been attained by the power unit and the associated aircraft, the operation of the internal components of the power unit are as follows:

Air entering the ram R at high velocity and at a pressure of 14.7 lbs. per square inch absolute, is compressed by impact to a pressure of approximately 18 lbs. per square inch absolute, at the inlet 11 to the axial blower $C_1$. The air is discharged from the axial blower at a pressure of approximately 26 lbs. per square inch absolute into the double scroll outlet housing 38—39 and thence through the outlet spigots 40 and 41 and ducts 42 and 43 to the wing skin intercoolers as best illustrated at 44—45 in Figures 4, 6, 7 and 20.

Cooled first stage compressed air from the said wing skin intercoolers returns through ducts 315 and 315' to the spigots 55 and 56 and thence to the entrance 58 of the first impeller of the multistage centrifugal compressor $C_2$. Compressed air from the first centrifugal rotor 59 passes through a liquid cooled surface intercooler 64 where it is again cooled and thence through centrifugal impellers 67 and 71 and finally through the diffuser vanes 75 into the entrance 145 of the combustion chamber Z at a final pressure of approximately 240 lbs. per square inch.

Here the compressed air is divided, a major portion flowing on through the internal passages of the burner tubes and through the substantially annular clearance spaces between the burner tubes and the combustion chamber housing 85 and inner shroud 86 and another portion of the air entering at 145 flows, for cooling purposes, down through the tapering, substantially annular passageway 144 formed between the conical shaped turbine bearing support member 124 and the said inner shroud 86 of the combustion chamber and its baffle extension 143, to the inner apex of the gas turbine rotor adjacent the rotor bearing 119. From here a portion of the cooling air turns, as indicated by arrow 146 best shown in Figure 26, tional speed increases and the velocity of sound decreases.

As previously stated, the axial blower speed is partially controlled or trimmed by governing the oil supply to the fluid coupling. This governing is accomplished by a needle valve 447, controlled by the Sylphon bellows 439 which is subjected on the exterior to the axial blower discharge pressure transmitted thereto through tube 452. If the axial blower pressure falls below a predetermined value the resultant reduction in pressure in the bellows housing 438 and the attendant expansion of the bellows 439 tends to close the needle valve and reduce the oil supply, thereby allowing the quantity of oil in the coupling to be reduced. This in turn reduces the degree of coupling between shafts 76 and 32 thus allowing the differential drive to function more freely to increase the axial blower speed relative to the input shaft 76 and thereby to apply a corrective effect upon the said axial blower discharge pressure. An increase of axial blower pressure above the same predetermined value similarly results in increased coupling between shafts 76 and 32 tending to reduce the axial blower speed relative to the shaft 76 and to apply again a corrective effect in the opposite sense upon the axial blower discharge pressure. Substantially constant axial compressor discharge pressure is thus maintained with variation in pressure altitude.

The expansion or contraction of the length of the said Sylphon bellows 439 corresponding to the respective decrease or increase of axial blower discharge pressure also acts at the same time through lever 434, link 432, crank 430 and through the mechanism before described in connection therewith in Figure 20, to increase or decrease the pitch of the blades of the plurality of boundary layer removal fans. The torque thus applied to the transmission accessory drive tends to vary inversely as a function of the axial blower discharge pressure, the effect of which is to apply a corrective effect through the differential transmission upon the axial blower speed.

For example, if the pressure altitude is increased with an attendant reduction in ram inlet pressure, the resultant initial reduction of the axial blower discharge pressure transmitted to and acting upon the Sylphon bellows 439 will tend to actuate the lever 434 and linkage leading from the lever pivot 433 to the push-pull rod 429 in such a manner as to increase the pitch of the boundary layer removal fan blades. The resultant increase in torque imposed on the said fans and the corresponding reduction in speed of the fan drive shafts will result, through the differential action of the transmission, in a corrective increase in axial blower speed which tends to return the axial blower discharge pressure to a constant value.

The initial setting and adjustment of the action of the said Sylphon bellows 439 for predetermination of the axial blower discharge pressure to be maintained may be made by the threaded adjustment on screw 440 which may be actuated remotely through a shaft and gearing 442 by means of a manually operated wheel 443 which may be located in the flight compartment for convenience.

It will be evident that in addition to the above coordinated action of the axial blower C—1, Sylphon bellows 439, and boundary layer removal fans 395, there is coordination between these parts and the control lever 463 which controls the fuel pump P and fuel metering valves. For example, when it is desired to increase the power output of the power plant during take-off of the airplane or during high altitude flight, the lever 463 is moved along the segment 470 in the direction of the arrow 471 in Figure 20 to increase the delivery of fuel to the combustion chamber. This movement of the lever 463 increases the pitch of the boundary layer removal fan blades and the resultant increase in torque of the accessory drive shaft 388 increases the speed of the axial blower to provide a proper fuel-air ratio for the increased power output. Movement of the lever 463, as just described, reduces the compression in the springs 461 and 455 or applies tension to the springs. This, in turn, results in expansion of the bellows 439 and movement of the linkage 434—432—430—429 to change the pitch of the boundary layer removal fan blades. This adjustment or regulation of the fans 395 accelerates removal of the boundary layer air to increase the lift and efficiency of the airfoil and, as previously described, increases the torque on the shaft 388 to increase the speed of operation of the axial blower. Thus, movement of the control lever 463 simultaneously increases the boost pressure developed by the axial blower, increases the effective pitch of the boundary layer removal fans, and increases the delivery of fuel to the combustion chamber in a proportionate or coordinated manner to obtain efficient amplified power output.

Referring now primarily to Figure 24 the operation of the variable nozzle opening is affected as follows:

The gas pressure in the secondary combustion chamber S which is transmitted through a plurality of ducts 170 coaxially extending throughout the length of the supporting rods 163 and into the head end of the annular cylinder 168 acts upon the piston 167 to which the rods are attached, in a manner tending to compress the springs 169 and to hold the annular throat member in a forward position of maximum opening as indicated by the dotted lines 165′. The said gas pressure in the head of cylinder 168 is governed by a bleed to atmosphere regulated by the needle valve 174 which is in turn actuated by the turbine speed governor 149 as hereinbefore described. The initial setting and adjustment of the speed governor 149 may be manually accomplished by a screw 153 remotely controlled by a wheel and shaft 158 and 154 which may be located in the flight compartment for convenience as before described.

If the gas pressure in the secondary combustion chamber S increases above a correct value due to bringing in of supplementary fuel injection for example, the turbine speed will tend to decrease due to the attendant back pressure, and the resultant corresponding increase in pressure in the cylinder 168 then tends to move the annular throat member forward in the nozzle to increase the effective area of the nozzle throat with an accompanying reduction of back pressure tending to correct the condition. If the pressure altitude of the aircraft varies the corresponding tendency upon gas turbine speed by changed compressor load also reacts on the governor and the accompanying actuation of the needle valve bleed is such as to correspondingly open or close the effective area of the throat in sufficient degree as to maintain substantially constant turbine speed as the pressure altitude is respectively increased or decreased.

tioned spray nozzle booster air pump 586 and oil pump 587.

The chief function of the rotation reversing transmission is substantially to balance or cancel out the gyroscopic effect of the various high speed rotating bodies within the unit, and its incidental value resides in the convenient facilities it provides for auxiliary drives of the type just mentioned. The balancing out of the gyroscopic forces is of great importance in a maneuvering type of airplane, particularly in a combat airplane to avoid precessional effects while making quick turns or "pull outs" from a dive.

The balance of the power from the turbine, not absorbed in driving the auxiliaries and second stage compressor is transmitted on through the shaft 76 to the axial blower transmission hereinbefore described primarily in connection with Figure 11. The operation of the said axial blower transmission is as follows:

The rotation of the shaft 76 is imparted through flange 193 to the planetary drive spider 194 and the plurality of planetary pinions 195 carried therein and also to the fluid coupling impeller 199 carried within the housing 30—31 upon the concentric shaft extension 196. As before described, the said planetary pinions 195 mesh on the inside with the sun gear 201 fixed to the axial blower shaft 32 and on the outside with the ring gear 203 fixed on the inside diameter of the accessory drive bevel gear 204. The axial blower shaft extension 196 and the bevel gear 204 are thus differentially driven by the before mentioned planetary pinions. The bevel gear 204 meshes with the plurality of bevel pinions as shown at 207, which drive a number of accessory shafts which extend radially from the differential transmission as shown at 208 and 388. The power transmitted through shaft 76 is thus divided by the planetary pinions 195, between the various accessory drive shafts and the axial blower shaft 32 or, in other words, the power transmitted through to the axial blower is the difference between the input of shaft 76 to the transmission and that absorbed by the accessory drives. The relative speed of rotation of said auxiliary shafts and blower shaft are likewise differential.

Assuming that the fluid coupling is substantially empty of oil the relative or differential speeds of the accessory drive shafts and the axial blower shaft will be entirely a function of the corresponding torque of the combined accessory drives relative to the torque of the axial blower. For example, if the torque on the accessory drive is light, resulting in its high speed, then the speed of the axial blower will be lower, but, if on the other hand, the load on the accessory drive is increased, resulting in lower accessory drive shaft speed, then the axial blower speed will be differentially higher. The methods by which the loading on the accessory differential drive is varied will be described hereinafter in connection with the boundary layer control apparatus.

Now if the fluid coupling housing is progressively filled with fluid by the introduction of oil under pressure from pump 587 by way of pipe 585, valve 447, pipe 449, fitting 576 and central bore 198 in shaft 32, and finally through the lateral inlet hole 197 in the coupling housing 30, the degree of coupling between the two shafts 32 and 196 may be progressively increased. In so doing the speed of the axial blower becomes progressively more directly dependent upon the transmission input speed of shaft 76—196 carrying the coupling impeller 199 and less dependent upon the differential effect of the loading of the accessory shafts, and the speeds of the accessory drives will at the same time be thereby increased with respect to said axial blower speed. In this manner a wide range of power distribution and relative speeds between the accessory drives and axial blower may be attained without the power losses customarily associated with variable speed drives which usually dissipate power wastefully.

The operation of the differential transmission of Figure 12 which is employed with the optional radial cylinder-piston type of second stage compressor is identical with that just before described in connection with Figure 11. With the said optional transmission of Figure 12, however, by reason of the fact that the piston type compressor does not have a continuous hollow central shaft extending axially through the compressor housing as in the case with the centrifugal flow type, the coupling fluid must be introduced directly into the end of the axial blower shaft 32 through another inlet connection 581 through the transmission housing, tube 580 and special fitting 582 having an axially extending tube 583 which makes an oiltight rotatable fit through a packing gland 584 into the said shaft bore.

In order to maintain the fluid couplings filled with oil, a constant supply must be maintained by the pump 587 to compensate for that constantly bled out of the fluid coupling housing through the annular clearance space 277 between housing 31 and shaft 196 and if the supply of oil is reduced below a certain maximum flow or completely cut off as by closing the needle valve 447, the coupling will slowly empty itself of fluid in this manner either until equilibrium between the rate of supply and loss of fluid is reached or until the fluid coupling is completely empty. The oil thus released from the fluid coupling is scavenged from the transmission housing through a suitable scavenging outlet connection as shown at 585 and returned through line 588 to the suction of the pump 587 as shown in Figure 20.

The differential power transmitted to the accessory shafts in the manner before described may be dissipated by rotation of the landing wheels and/or by the counter-rotating propellers for take-off, by driving on the boundary layer removal fans, and coolant fluid circulating pumps and/or other accessory equipment. During cruising flight conditions the accessory power absorption from the differential transmission is largely controlled by varying the load on the plurality of boundary layer removal fans, and this is accomplished by variation of the pitch of the fan blades as hereinbefore described in connection with Figure 20; or the power may be varied by valving the boundary layer air as shown in Figure 21, thereby varying the power requirements for the boundary control centrifugal blowers 516. The torque requirement of the above named accessories tends to be greatest at times when the axial blower speed must be high, hence the load distribution through the differential is essentially self-regulating, affecting a large power saving. Not only is a variable speed drive thereby attained for the axial blower to increase its speed at altitude, but the propeller slows down correspondingly at altitude as its pitch increases subject to a pitch control of conventional type such as that shown in United States Patent No. 1,893,612 to Caldwell. Thereby shock losses are avoided in the propeller as the airplane translatial impact compression of the air within the ram which is equal to the entrance and friction losses therein. This condition may occur requiring opening of the automatic shutters to deliver air at a minimum loss of pressure to the axial blower intake during take-off and steep climbing maneuvers of the aircraft when the speed is relatively low. These openings are preferably constructed with spring loaded leaves adapted to automatically open inward under a slight inwardly directed differential pressure and to close when the ram pressure is equal to the external atmospheric pressure.

In Figures 1–3 the power plant unit controls and auxiliary equipment employed is identical to that described hereinbefore in connection with Figures 4–7 except that the auxiliary and accessory drive shafts may be rearranged to extend from the axial blower housing and the counterrotation transmission housing at other points as may be conveniently suited to that particular aircraft structure and arrangement. Here the boundary layer fans for both wings as shown for one wing at 305 to 308 are driven from the laterally extending shafts 325 and 326 through bevel gears 328 and 329 which are in turn driven from the obliquely extending auxiliary drive shafts 327 and 328. The said fans 305—308 act to draw in the boundary layer air through the wing slots 309 to 312, and by way of the wing ducts 304 deliver the air to the chamber formed around the power unit by the shroud 303 where it serves to cool the unit housing and from there the air moves rearwardly through the annular space 302 to the forward converging portion 183 of the augmenter 182 and on out with the propulsive jet issuing from the nozzle N and finally leaving the divergent portions 182 of the augmenter.

When the power unit is in normal operation the overriding clutch 540 acts to disengage the generator drive shaft 538 from the accessory drive shaft 187 through which the unit is started as before described. Following this, the generator E is driven solely from the air turbine 537 by air fed through either one or both of the nozzles 541 or 542. Ordinarily the air throttle 546 is actuated by means of a voltage sensitive device 568 in such manner as to supply just sufficient air to primary nozzle 541 to meet the power requirement for current demanded for changing the batteries and for the various electrical facilities within the aircraft.

Air for conditioning and pressurizing the cabin 557 is supplied through pipe 556 from the exhaust 555 of the air turbine secondary nozzle 542 which in turn receives compressed air from the discharge of the second stage compressor of the power unit through pipe 424, 544 and the two-way cock 549. The compressed air may be fed to the secondary nozzle 542 either direct through pipe 550 or through an intercooler 552 or both in proportions determined by the adjustment of cock 549 which is actuated by means of suitable electrically operated means 561 connected through the conductor 560 with a thermostat control 559 exposed to the cabin air being exhausted at 558.

When the air is delivered direct to the secondary jet 542 without intercooling, it leaves the turbine warm even after expansion therein. If, however, the air is passed through the intercooler 552 prior to delivery to the nozzle 542 the subsequent expansion in the turbine will be sufficient to appreciably cool the air. By adjustment of the relative quantities of cooled and uncooled air delivered to the said turbine nozzle 542 the temperature of the air delivered to the cabin under pressure through the duct 556 can be controlled as desired.

While the gas turbine bucket or blade roots may be effectively cooled, as described in the foregoing, particularly in connection with Figure 24, which cooling enables the use of higher turbine gas temperatures than would otherwise be possible, and with resultant improved power plant efficiency, the gas temperatures may be safely elevated even still further while still retaining said cooling arrangement, if the buckets are constructed of special materials having at elevated temperatures yield points which are much higher than those of the more commonly known alloy steels. For example, the metal, tantalum, having a melting point of 5160° F. is particularly suitable insofar as its physical properties at high temperatures are concerned, but it is necessary to employ special methods in the preparation and formation of this material.

One such method which may be employed in the fabrication of the turbine buckets is as follows: tantalum powder either alone or with a small admixture of other powdered metals to be alloyed therewith, if desired, is hydraulically molded, at high pressure to a slightly oversized, approximate shape of the bucket to be formed. The thus molded powder is then sintered in an induction furnace at a temperature of approximately 4000° F. and in an inert atmosphere, such as nitrogen, helium or argon, from which oxygen is carefully excluded or preferably in a vacuum. During this sintering process the molded material shrinks in the attendant consolidation process to form a slightly undersized blank. The molded material is thereby converted into a substantially homogeneous piece of metal of high physical strength, but it cannot be immediately used in that form due to the fact that it does not then accurately conform to the required dimensions and it is readily attacked when exposed to combustion gases at high temperatures. Therefore, the blank which as before stated, has shrunk to a size slightly smaller than that required of the finished part during the sintering process, is next electroplated with a protective coating of chromium sufficiently thick to build up the blank to oversize.

The resultant form is then heated to the forging temperature of chromium and after being allowed to soak at that temperature for the required time to allow sufficient diffusion and alloying of the plating and core materials at their surfaces of mutual contact to form a high degree of bonding, it is sized in dies of the exact shape and dimensions of the finished bucket. The chromium coating which has a melting point of 2940° F. is dense, hard, and suitably inactive chemically and resistant to abrasion and erosion to form an extremely satisfactory protective coating for the comparatively more chemically active but physically stronger tantalum core. Such a bucket will operate continuously at a temperature in the neighborhood of 2000° F. without substantial thermal, corrosion or erosion difficulties. The turbine buckets and the method for making the same form the subject of my copending application, Serial No. 574,286, filed January 24, 1945, which issued as Pat. No. 2,520,373.

In connection with the various combinations of propulsive means included in the foregoing description of the invention it is to be noted that the pure fluid reaction type of driving thrust and power which the unit of this invention is capable To summarize the power balance of the plant, the gas turbine carries whatever load is imposed on it from the compression system and from airplane auxiliaries. If then the turbine produces a power excess the speed governor will increase the back pressure on the turbine or vice versa. Therefore, the gas turbine and directly connected second stage blower are operated as constant speed devices. Such being the case the efficiency of these units is particularly high under all conditions and at all altitudes and the power plant is very stable under conditions of rapid change of load.

Referring now primarily to Figures 1 to 3 and 22, hereinbefore described, the operation of the power driven landing gear is as follows:

Power is transmitted from the axial blower differential transmission through a suitably located auxiliary drive shaft 330 extending down from the transmission housing to the bevel gear drive 331—332 and thence at right angles thereto through the shafts 333 and 334 which extend laterally out into the wings to drive mechanism in the wing structure at a point adjacent the landing gear attachments. One of said shafts, 333, and its method of coupling to the power driven landing gear mechanism is shown and now described in connection with the enlarged detail thereof in Figure 22. For driving the aircraft off the ground or for acceleration on the ground preparatory to take-off, suitable fluid pressure is applied to the cylinder 363 through line 364 to force the piston 362 and the attached cone 366 of the clutch into frictional driving contact with the corresponding conical surface of the driven clutch member 368 with the result that the rotative power from the differential drive is transmitted from the shaft 333, through the clutch and splined stub shaft 350, bevel gears 335 and 336, vertical tubular shaft 357, splined shaft 354, helical pinion and gear 353 and 352, horizontal pinion shaft 347 and drive pinion 346 and finally to the wheel drive ring gear 344 carried on the wheel hub 345.

During the latter portion of take-off, or when the wheel contact with the ground has been broken, the fluid pressure may be relieved from line 364 and sufficient pressure applied to line 365 to disengage the clutching surfaces 366 and 368 and thus to allow the landing gear wheel 337 to idle to a stop prior to its retraction within the wing by rotation of the whole gear rearwardly upon the trunnions 340 and 341. The retraction may be accomplished by well-known conventional means, not shown.

In landing the aircraft, following the extension of the retractable gear preparatory to landing, the clutch may again be energized as just described by applying fluid pressure to line 364 again to bring the clutching surfaces 366 and 368 into driving contact to establish pre-rotation of the wheels to a peripheral speed corresponding approximately to that of the relative speed of the ground surface at landing speed, then upon re-establishment of wheel contact with the ground the drag of the power unit may be utilized to effect the initial braking of the aircraft landing speed. The final braking or all of the braking action may be effected, if desired, by applying suitable fluid pressure to line 365 to act upon the piston 362 to force the inner surface of the conical member 366 into frictional contact with the adjacent stationary, conical braking surface 367. The fluid pressures in lines 364 and 365 may be actuated by suitable valves coupled to pilot operated rudder control pedals not shown herein.

The operation of the optional type of twin wheel type landing of Figure 23 is similar to that before described in connection with the single wheel landing gear of Figure 22.

Advantages of the power driven landing gear as herein described when employed in conjunction with the reaction propulsive prime mover of the type of the present invention is primarily that the length of run required for take-off is considerably reduced. The reason for this is that the thrust of this type of power plant is substantially constant and independent of speed of the aircraft. At take-off speeds the thrust of the unit is considerably lower than that of units employing conventional propeller drives, however at cruising speed of, for example, 600 feet per second and greater, the thrust of the reaction propulsive unit of this invention still remains practically undiminished, whereas the thrust of the conventional propeller drive unit will have fallen off to a value considerably below that of the said reaction propulsive unit.

It is evident from the embodiments of the invention illustrated herein that a large power can be transmitted to the landing gear wheels without interfering with the retractability and shock absorbing devices necessarily associated therewith.

Additional advantages of the type of powered landing gear are, as before stated, that the wheels may be pre-rotated prior to landing to reduce the scuffing wear on the tires and to reduce the shock stresses throughout the structure upon initial landing contact with the ground. Additionally, brake shoe wear is reduced by permitting the braking torque to be transmitted back into the idling power plant during the landing run, allowing the thus motored power plant to absorb the greater portion of the braking energy.

Optionally, or in addition to the powered landing gear, auxiliary propellers may be employed for shortening the take-off run and also for increasing the initial rate of climb of the aircraft. These propellers, as hereinbefore described in connection with Figures 1 to 3 and 11, may be mounted in any suitable location such as, for example, on the nose of the airplane fuselage, and adapted to counter-rotation upon suitable bearings concentric with and surrounding the air intake ram. The blades of the propellers are preferably constructed so as to fold back into suitable recesses as shown at 620 and 621 provided in the adjacent nose portion of the fuselage. The operation of the propellers are such that upon take-off and climbing operations they are extended and driven in counter-rotation from the power plant through the before described pair of parallel shafts 320 and 321. Upon reaching speed and altitude the propeller drives are disengaged and stopped by means of clutches similar to that employed in the landing gear drive mechanism, and the blades then folded back into the before mentioned recesses 620 and 621 so as to present a minimum of resistance to the continued increase in speed of the aircraft under the reactive thrust of the power unit.

A plurality of automatically operated shuttered openings 19 arranged to enter the ram from the propeller blade recesses for convenience, as shown in Figures 1 and 2, serve to aid in the free entrance of air into the ram and into the intake of the axial blower during such times when the speed of the aircraft is insufficient to perform inilanding wheels, means coupling said wheels to the other output shaft comprising a slip clutch for transmitting power to said wheels, the clutch including a driving element, a driven element, a stationary braking element, and means for differentially controlling the degree of engagement between said driven element and said stationary element and driving element.

6. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, means coupling auxiliary power absorbing apparatus associated with the propulsive unit to said other shaft, and means responsive to the first stage compressor discharge pressure to vary the torque exerted on said other shaft by said auxiliary apparatus whereby the power output may be divided between said output shafts and the speed of the first stage compressor may be varied with respect to said second stage compressor so as to tend to maintain the first stage compressor discharge pressure constant.

7. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, means coupling auxiliary power absorbing apparatus associated with said propulsive unit to the other output shaft, and means to vary the torque exerted on said other shaft by said auxiliary apparatus whereby the power output may be divided between said output shafts and the speed of the first stage compressor may be varied with respect to said second stage compressor, said auxiliary power absorbing apparatus comprising power driven landing gear wheels.

8. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, means coupling auxiliary power absorbing apparatus associated with said propulsive unit to the other output shaft, and means to vary the torque exerted on said other shaft by said auxiliary apparatus whereby the power output may be divided between said output shafts and the speed of the first stage compressor may be varied with respect to said second stage compressor, said auxiliary power absorbing apparatus comprising a power driven propeller.

9. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, means coupling auxiliary power absorbing apparatus associated with the propulsive unit to said other shaft, and means responsive to the first stage compressor discharge pressure to vary the torque exerted on said other shaft by said auxiliary apparatus whereby the power output may be divided between said output shafts and the speed of the first stage compressor may be varied with respect to said second stage compressor so as to tend to maintain the first stage compressor discharge pressure constant, said auxiliary power absorbing apparatus comprising a boundary layer control fan.

10. In an aircraft, an airfoil having a boundary layer removal slot, propulsive means comprising a gas turbine, a nozzle associated with the turbine for producing a propulsive jet, compressor means, and a differential type transmission between the turbine and compressor means having an auxiliary output shaft, and means driven by said shaft for removing the boundary layer air through said slot.

11. In an aircraft, an airfoil having a boundary layer removal slot, propulsion means comprising a gas turbine, a nozzle associated with the turbine for producing a propulsive jet, compressor means, and a differential type transmission between the turbine and compressor means having an output shaft, a variable pitch fan driven by said shaft for removing the boundary layer air through said slot, and means for varying the pitch of said fan and thus vary the torque on said shaft including a control responsive to pressure in the compressor means, and an operative connection between the control and the fan.

NATHAN C. PRICE.

REFERENCES CITED

The following references are of record in the file of this patent:

UNITED STATES PATENTS

| Number | Name | Date |
|---|---|---|
| 658,586 | Reiling | Sept. 25, 1900 |
| 682,107 | Morrow | Sept. 3, 1901 |
| 799,856 | Lemale | Sept. 19, 1905 |
| 999,976 | De Ferranti | Aug. 8, 1911 |
| 1,045,961 | De Ferranti | Dec. 3, 1912 |
| 1,102,345 | Lemale | July 7, 1914 |

(Other references on following page)

of producing is preferable for extremely high velocity and high altitude flight of the aircraft with which it is associated, while certain combinations of fluid reaction with either propeller or landing gear drive or both may be desirable under other conditions. For example, in a certain case it has been found that for a given power capacity the initial thrust and accelerating ability of the power unit employing the pure jet reaction type of drive and remains so up to speeds of approximately 100 miles per hour where the thrusts of the two types of drive become substantially equal. Above the speed of 100 miles per hour the thrust of the propeller gradually falls off while that of the jet reaction unit remains practically constant until at approximately 500 miles per hour the thrust of the propeller drive is only a fraction of that of the jet reaction. With this condition in view it has been found desirable to employ auxiliary landing gear drive and/or auxiliary propeller drive to increase the initial thrust and accompanying acceleration of the aircraft during the take-off maneuvers. After take-off the driven landing gear may then be disengaged and retracted while the propellers may be continued to be employed for the initial climb while the aircraft speed is relatively low. At altitude the auxiliary propellers may then be stopped and folded within the fuselage in the manner hereinbefore described, after which pure jet reaction may then be exclusively employed for the continued acceleration and high speed flight at altitude.

In certain airplanes of the interceptor type which are designed for relatively light loads and extremely high speeds, the auxiliary propeller drive may be omitted, but retaining, preferably the driven landing gear to aid in the initial take-off. However, in airplanes of the bomber or freight carrying type which are designed for heavy loads, the auxiliary propeller is desirable in aiding in the take-off maneuver and in the subsequent climb to altitude at relatively low speed.

From the foregoing it will be evident that the invention may have a number of equivalent embodiments and several forms and arrangements of associated apparatus. It is to be understood that the foregoing is not to be limiting but may include any and all forms of method and apparatus which are included within the scope of the claims.

I claim:

1. In a gas turbine power plant, a gas turbine, a first stage compressor and a second stage compressor for supplying combustion air for the turbine, a combustion chamber between the second stage compressor and the turbine, driving means coupling the turbine with the compressors, means for varying the speed of the first stage compressor with respect to the second stage compressor comprising a differential transmission having an input shaft coupled with said turbine and two output shafts, means coupling the first stage compressor to one of said output shafts, a controllable auxiliary power absorbing device driven by the other output shaft whereby the power output is divided between said shafts and the speed of the first stage compressor may be varied, variable fuel supply means for the combustion chamber, and a manually operable control for simultaneously regulating the fuel supply means and said auxiliary device.

2. In a gas turbine power plant, a gas turbine, a first stage compressor and a second stage compressor for supplying combustion air for the turbine, a combustion chamber between the second stage compressor and the turbine, driving means coupling the turbine with the compressors, means for varying the speed of the first stage compressor with respect to the second stage compressor comprising a differential transmission having an input shaft coupled with said turbine and two output shafts, means coupling the first stage compressor to one of said output shafts, a controllable auxiliary power absorbing device driven by the other output shaft whereby the power output is divided between said shafts and the speed of the first stage compressor may be varied, a fuel injection system for the combustion chamber, and a manually operable control lever for simultaneously controlling the fuel injecting system and said auxiliary device.

3. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, and means for varying the torque on the other output shaft whereby the power output may be divided between said output shafts and the speed of the first stage compressor may be varied with respect to the second stage compressor.

4. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, means coupling auxiliary power absorbing apparatus associated with said propulsive unit to the other output shaft, and means to vary the torque exerted on said other shaft by said auxiliary apparatus whereby the power output may be divided between said output shafts and the speed of the first stage compressor may be varied with respect to said second stage compressor.

5. In a gas reaction propulsive unit, the combination of, a gas turbine, first and second stage compressors for supplying combustion air for the turbine, a combustion chamber between the second stage compressor and turbine, driving means coupling the turbine with said compressors whereby the turbine drives the compressors, and means associated with the driving means to vary the speed of the first stage compressor with respect to the speed of the second compressor including a differential type transmission having a power input shaft coupled to the turbine and two power output shafts differentially driven by the input shaft, means coupling the first stage compressor to one of the output shafts, power driven

UNITED STATES PATENTS

| Number | Name | Date |
|---|---|---|
| 1,316,021 | Doble | Sept. 16, 1919 |
| 1,524,352 | Gephart | Jan. 27, 1925 |
| 1,750,417 | McClellan et al. | Mar. 11, 1930 |
| 1,779,009 | Negro | Oct. 21, 1930 |
| 1,783,590 | Simon | Dec. 2, 1930 |
| 1,947,477 | Lysholm | Feb. 20, 1934 |
| 1,977,553 | Halford | Oct. 16, 1934 |
| 2,018,914 | Endres | Oct. 29, 1935 |
| 2,024,274 | Campini | Dec. 17, 1935 |
| 2,047,555 | Gardner | July 14, 1936 |
| 2,050,349 | Lysholm et al. | Aug. 11, 1936 |
| 2,063,706 | Soderberg | Dec. 8, 1936 |
| 2,069,718 | Feild | Feb. 2, 1937 |
| 2,072,277 | Pogue | Mar. 2, 1937 |
| 2,085,761 | Lysholm | July 6, 1937 |
| 2,095,991 | Lysholm | Oct. 19, 1937 |
| 2,141,401 | Martinka | Dec. 27, 1938 |
| 2,161,517 | Keller | June 6, 1939 |
| 2,164,545 | Rogers | July 4, 1939 |
| 2,168,726 | Whittle | Aug. 8, 1939 |
| 2,238,889 | Kollman | Apr. 22, 1941 |
| 2,244,467 | Lysholm | June 3, 1941 |
| 2,270,920 | Backhaus | Jan. 27, 1942 |
| 2,280,835 | Lysholm | Apr. 28, 1942 |
| 2,284,473 | Menasco et al. | May 26, 1942 |
| 2,284,984 | Nixon et al. | June 2, 1942 |
| 2,290,884 | Kollmann | July 28, 1942 |
| 2,297,239 | Neugebauer et al. | Sept. 29, 1942 |
| 2,304,008 | Müller | Dec. 1, 1942 |
| 2,322,824 | Büchi | June 29, 1943 |
| 2,336,844 | Buck | Dec. 14, 1943 |
| 2,404,335 | Whittle | July 16, 1946 |
| 2,404,428 | Bradbury | July 23, 1946 |
| 2,405,164 | Pavlecka | Aug. 6, 1946 |

FOREIGN PATENTS

| Number | Country | Date |
|---|---|---|
| 244,032 | Great Britain | Mar. 18, 1926 |
| 347,206 | Great Britain | Apr. 16, 1931 |
| 368,317 | Great Britain | Mar. 4, 1932 |
| 480,236 | Great Britain | Feb. 18, 1938 |
| 848,225 | France | July 17, 1939 |
| 675,882 | Germany | May 20, 1939 |

OTHER REFERENCES

Publication: "Flight," issue of Oct. 9, 1941; pages 239 and 242.